(12) United States Patent
Smith et al.

(10) Patent No.: US 6,857,064 B2
(45) Date of Patent: Feb. 15, 2005

(54) METHOD AND APPARATUS FOR PROCESSING EVENTS IN A MULTITHREADED PROCESSOR

(75) Inventors: Lawrence O. Smith, Beaverton, OR (US); S. Dion Rodgers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 560 days.

(21) Appl. No.: 10/006,348

(22) Filed: Nov. 30, 2001

(65) Prior Publication Data

US 2002/0116600 A1 Aug. 22, 2002

Related U.S. Application Data

(63) Continuation-in-part of application No. 09/458,544, filed on Dec. 9, 1999.

(51) Int. Cl.[7] .................................................. G06F 9/38
(52) U.S. Cl. ........................ 712/244; 712/228; 710/260
(58) Field of Search ................................. 712/228, 244; 710/260

(56) References Cited

U.S. PATENT DOCUMENTS

| | | | |
|---|---|---|---|
| 3,771,138 A | 11/1973 | Celtruda et al. | |
| 5,357,617 A | 10/1994 | Davis et al. | |
| 5,361,337 A | 11/1994 | Okin | |

(List continued on next page.)

FOREIGN PATENT DOCUMENTS

| | | | |
|---|---|---|---|
| EP | 0346003 A2 | 12/1989 |
| EP | 0352935 A3 | 1/1990 |
| EP | 0352935 A2 | 1/1990 |
| EP | 0725335 A1 | 8/1996 |
| EP | 0747816 A2 | 12/1996 |
| EP | 0768608 A2 | 4/1997 |
| EP | 0827071 A2 | 3/1998 |
| EP | 0768608 A3 | 8/1998 |
| EP | 0856797 A1 | 8/1998 |
| EP | 0863462 A2 | 9/1998 |
| EP | 0864960 A1 | 9/1998 |
| EP | 0962856 A2 | 12/1999 |
| GB | 2311880 A | 10/1997 |
| WO | WO 99/21082 A1 | 4/1999 |
| WO | WO 99/21088 A1 | 4/1999 |

OTHER PUBLICATIONS

"Instruction Cache Fetch Policies for Speculative Execution", Dennis Lee et al., 22nd International Symposium on Computer Architecture, Jun. 1995.

"Multithreading for Rookies", Ruediger R. Asche, http://www.microsoft.com/win32dev/base/threads.htm, Jul. 31, 1998.

Simon W. Moore, *Multithreaded Processor Design*, Kluwer Academic Publishers, 1996.

(List continued on next page.)

*Primary Examiner*—William M. Treat
(74) *Attorney, Agent, or Firm*—Blakely, Sokoloff, Taylor & Zafman LLP

(57) ABSTRACT

In a multithreaded processor, events are categorized according to which of a "soft" state clearing ("nuke") process and a "hard" nuke process should be performed in response to each event. When an event is detected for a thread, either the soft nuke or hard nuke process is executed, according to the type of event, prior to invoking an event handler. The soft nuke process performs less than all of the actions performed by the hard nuke process and requires much less time to execute. If multiple threads are being processed, the hard nuke process requires synchronization between the threads and clears state for each thread, whereas the soft nuke process does not require cross-thread synchronization and clears state only for the thread in which the event was detected. In one embodiment, the soft nuke process is implemented in microcode, while the hard nuke process is hardware-implemented.

61 Claims, 19 Drawing Sheets

U.S. PATENT DOCUMENTS

| | | |
|---|---|---|
| 5,386,561 A | 1/1995 | Huynh et al. |
| 5,392,437 A | 2/1995 | Matter et al. |
| 5,404,469 A | 4/1995 | Chung et al. |
| 5,430,850 A | 7/1995 | Papadopoulos et al. |
| 5,499,349 A | 3/1996 | Nikhil et al. |
| 5,524,263 A | 6/1996 | Griffith et al. |
| 5,553,291 A | 9/1996 | Tanaka et al. |
| 5,586,332 A | 12/1996 | Jain et al. |
| 5,630,130 A | 5/1997 | Perotto et al. |
| 5,761,522 A | 6/1998 | Hisanaga et al. |
| 5,787,297 A | 7/1998 | Lin |
| 5,791,522 A | 8/1998 | Lee et al. |
| 5,809,271 A | 9/1998 | Colwell et al. |
| 5,809,522 A | 9/1998 | Novak et al. |
| 5,892,959 A | 4/1999 | Fung |
| 5,900,025 A | 5/1999 | Sollars |
| 5,968,160 A | 10/1999 | Saito et al. |
| 5,983,339 A | 11/1999 | Klim |
| 5,996,085 A | 11/1999 | Cheong et al. |
| 5,999,932 A | 12/1999 | Paul |
| 6,009,454 A | 12/1999 | Dummermuth |
| 6,052,708 A | 4/2000 | Flynn et al. |
| 6,052,709 A | 4/2000 | Paul |
| 6,085,218 A | 7/2000 | Carmon |
| 6,088,788 A | 7/2000 | Borkenhagen et al. |
| 6,092,175 A | 7/2000 | Levy et al. |
| 6,105,127 A | 8/2000 | Kimura et al. |
| 6,115,709 A | 9/2000 | Gilmour et al. |
| 6,212,544 B1 | 4/2001 | Borkenhagen et al. |
| 6,233,599 B1 | 5/2001 | Nation et al. |
| 6,256,775 B1 | 7/2001 | Flynn |
| 6,289,461 B1 | 9/2001 | Dixon |
| 6,314,530 B1 | 11/2001 | Mann |
| 6,789,181 B1 * | 9/2004 | Yates et al. ................ 712/4 |

OTHER PUBLICATIONS

"Performance Study of a Multithreaded Superscalar Microprocessor", Manu Gulati et al., *Proceedings Second International Symposium on High–Performance Computer Architecture*, Feb. 3–7, 1996, pp. 291–301.

"A Benchmark Evaluation of a Multi–Threaded RISC Processor Architecture", R. Guru Prasadh et al., *1991 International Conference on Parallel Processing*, pp. I–84–I91.

"Multithreading Comes of Age", Peter Song, *Microdesign Resources*, Jul. 14, 1997, pp. 13–18.

"Architectural and Implementation Tradeoffs in the Design of Multiple–Context Processors", James Laudon et al., *Multithreaded Computer Architecture: A Summary of the State of the Art*, chapter 8, pp. 167–200, Kluwer Academic Publishers 1994.

Dean M. Tullsen et al., "Exploiting Choice: Instruction Fetch and Issue on an Implementable Simultaneous Multithreading Processor", pp. 191–202, XP 000592185.

"Evaluation of Multithreaded Uniprocessors for Commerical Application Environments", Richard J. Eickemeyer et al., *Proceedings of the 23rd Annual International Symposium on Computer Architecture*, May 22–24, 1996, pp. 203–212.

MK Farrens et al., "Strategies for Achieving Improved Processor Throughput", *The 18th Annual International Symposium on Computer Architecture*, May 27–30, 1991, pp. 362–369.

A. Mendelson et al., "Design Alternatives of Multithreaded Architecture", *International Journal of Parallel Programming*, Dec. 9, 1996, vol. 27, No. 3, pp. 161–193, Plenum Publishing Corporation.

D. Steere et al., "A Feedback–driven Proportion Allocator for Real–Rate Scheduling", *Third Symposium on operating Systems Design and Implementations*, Feb. 22–25, 1999, pp. 145–158, XP002153159.

Intel, "P6 Family of Processors", *Hardware Developer's Manual*, Sep. 1998, XP–002153160.

IBM, "Improved Dispatching in a Rendering Context Manager", *IBM Technical Disclosure Bulletin*, Dec. 1990, pp. 131–134, vol. 33, No. 7, XP000108363 ISSN: 0018–8689, Armonk, NY.

Roa P. Pokala et al., "Physical Synthesis for Performance Optimization", Vertex Semiconductor, pp. 34–37, San Jose, CA, XP–002158891.

Gregory T. Byrd et al., "Multithreaded Processor Architectures", IEEE Spectrum, 8045, No. 8, pp. 38–46, New York, Aug. 1995, XP 000524855.

Mark R. Thistle et al., "A Processor Architecture for Horizon", IEEE, pp. 35–41, 1988, XP 000042422.

K. Dongwook et al., "A Partitioned On–Chip Virtual Cache for Fast Processors," Journal of Systems Architecture, Elsevier Science Publishers BV., Amsterdam, NL, vol. 43, No. 8, May 1, 1997, pp. 519–531, XP000685730.

\* cited by examiner

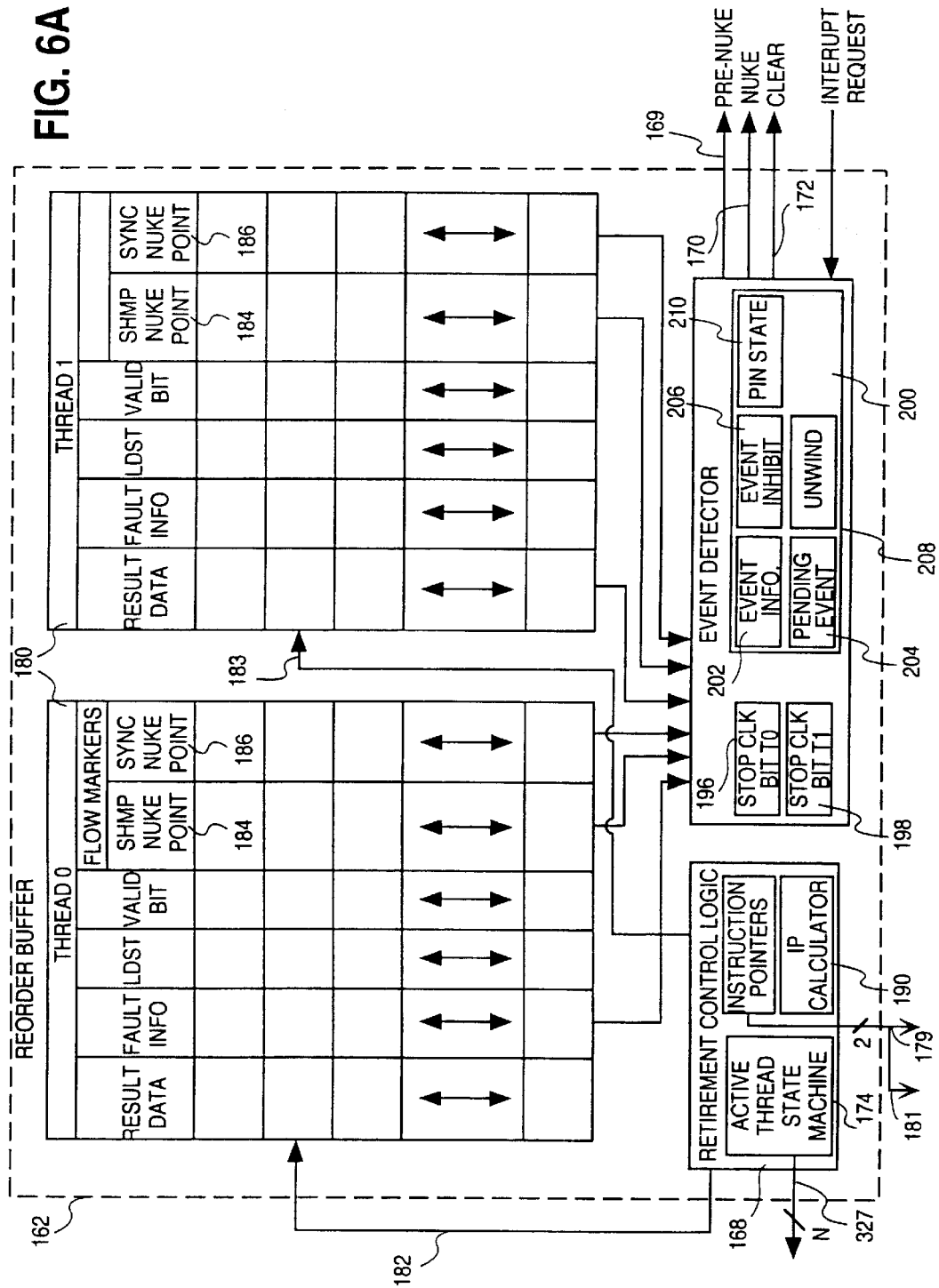

METHOD AND APPARATUS FOR PROCESSING EVENTS IN A MULTITHREADED PROCESSOR

This is a continuation-in-part of application no. 09/458,544, of Rodgers et al., filed on Dec. 9, 1999.

FIELD OF THE INVENTION

The present invention relates generally to the field of multithreaded processors and, more specifically, to a method and apparatus for processing an event occurrence within a multithreaded (MT) processor.

BACKGROUND OF THE INVENTION

Multithreaded (MT) processor design is one option for increasing the performance of processors. Multithreading within a processor provides the potential for more effective utilization of various processor resources, and particularly for more effective utilization of the execution logic within a processor. Specifically, by feeding multiple threads to the execution logic of a processor, clock cycles that would otherwise have been idle due to a stall or other delay in the processing of a particular thread may be utilized to service a further thread. A stall in the processing of a particular thread may result from a number of occurrences within a processor pipeline. For example, a cache miss or a branch misprediction (i.e., a long-latency operation) for an instruction included within a thread typically results in stalling of the processing of the relevant thread. The negative effect of long-latency operations on execution logic efficiencies is exacerbated by the recent increases in execution logic throughput that have outstripped advances in memory access and retrieval rates.

Multithreaded computer applications are also becoming increasingly common in view of the support provided to such multithreaded applications by a number of popular operating systems, such as the Windows NT® and Unix operating systems. Multithreaded computer applications are particularly efficient in the multi-media arena.

Multithreaded processors may broadly be classified into two categories, i.e., fine or coarse designs, according to the thread interleaving or switching scheme employed within the relevant processor. Fine multithreaded designs support multiple active threads within a processor and typically interleave two different threads on a cycle-by-cycle basis. Coarse multithreaded designs typically interleave the instructions of different threads on the occurrence of some long-latency event, such as a cache miss. A coarse multithreaded design is discussed in Eickemayer, R.; Johnson, R.; et al., "Evaluation of Multithreaded Uniprocessors for Commercial Application Environments", *The 23rd Annual International Symposium on Computer Architecture*, pp. 203–212, May 1996. The distinctions between fine and coarse designs are further discussed in Laudon, J; Gupta, A, "Architectural and Implementation Tradeoffs in the Design of Multiple-Context Processors", *Multithreaded Computer Architectures: A Summary of the State of the Art*, edited by R. A. Iannuci et al., pp. 167–200, Kluwer Academic Publishers, Norwell, Mass., 1994. Laudon further proposes an interleaving scheme that combines the cycle-by-cycle switching of a fine design with the full pipeline interlocks of a coarse design (or blocked scheme). To this end, Laudon proposes a "back off" instruction that makes a specific thread (or context) unavailable for a specific number of cycles. Such a "back off" instruction may be issued upon the occurrence of predetermined events, such as a cache miss. In this way, Laudon avoids having to perform an actual thread switch by simply making one of the threads unavailable.

A multithreaded architecture for a processor presents a number of further challenges in the context of an out-of-order, speculative execution processor architecture. More specifically, the handling of events (e.g., branch instructions, exceptions or interrupts) that may result in an unexpected change in the flow of an instruction stream is complicated when multiple threads are considered. In a processor where resource sharing between multiple threads is implemented (i.e., there is limited or no duplication of functional units for each thread supported by the processor), the handling of event occurrences pertaining to a specific thread is complicated in that further threads must be considered in the handling of such events.

Where resource sharing is implemented within a multithreaded processor, it is further desirable to attempt increased utilization of the shared resources responsive to changes in the state of threads being serviced within the multithreaded processor.

SUMMARY OF THE INVENTION

The present invention includes a processor which comprises retirement logic from which microinstructions for both a first thread and a second thread being processed are retired, and an event detector coupled to the retirement logic. The event detector is to detect an event for the first thread; responsive to the detection of the event, to determine whether to execute a first state clearing process or a second state clearing process; and, to execute either the first state clearing process or the second state clearing process, depending on the event.

Other features of the present invention will be apparent from the accompanying drawings and from the detailed description which follows.

BRIEF DESCRIPTION OF THE DRAWINGS

The present invention is illustrated by way of example and not limited in the figures of the accompanying drawings, in which like references indicate similar elements, and in which:

FIG. 6A is a block diagram illustrating details regarding a re-order buffer, according to one embodiment, that is logically partitioned to service multiple threads within a multithreaded processor;

DETAILED DESCRIPTION

Figure 1:
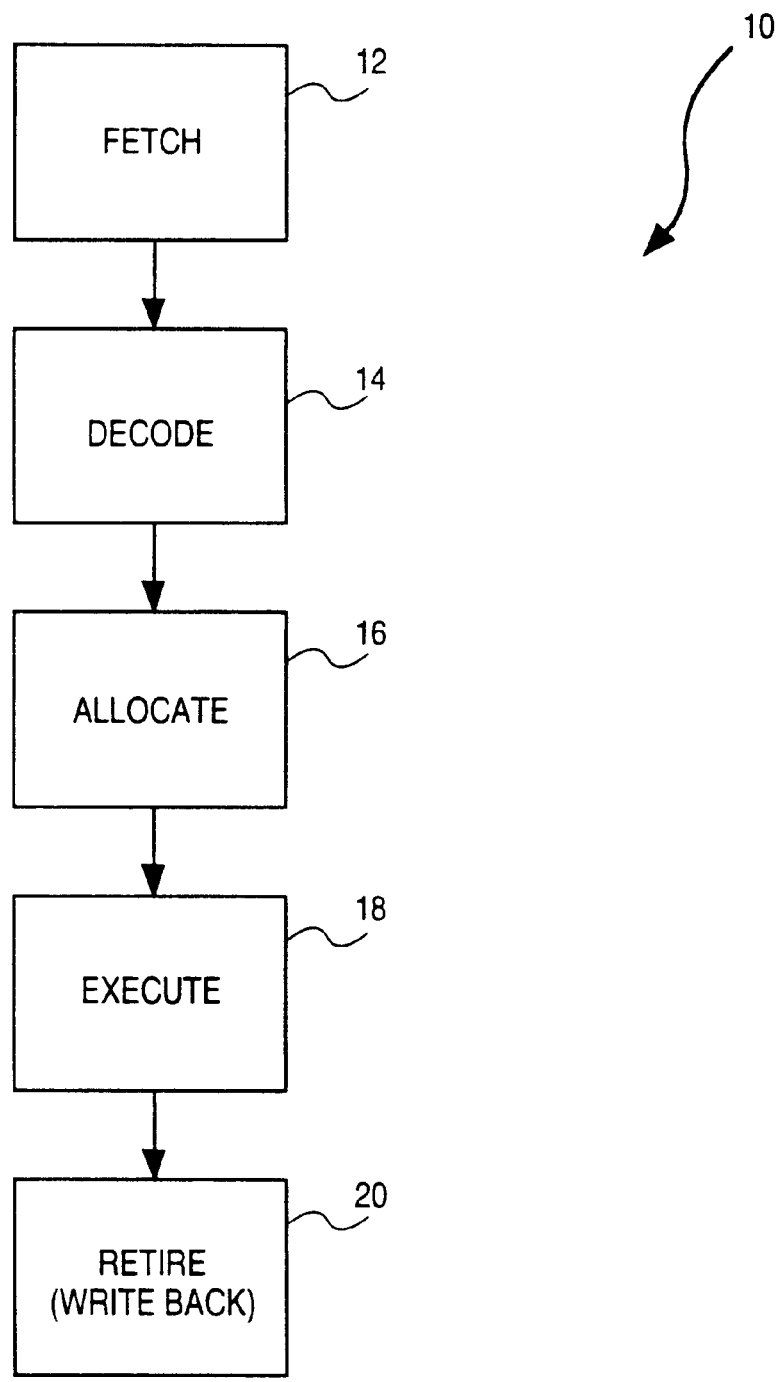
FIG. 1 is a block diagram illustrating one embodiment of a pipeline of a processor with multithreading support.

A method and apparatus for processing an event occurrence within a multithreaded processor are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include a variety of combinations and/or integrations of the embodiments described herein.

For the purposes of the present specification, the term "event" shall be taken to include any event, internal or external to a processor, that causes a change or interruption to the servicing of an instruction stream (macro- or microinstruction) within a processor. Accordingly, the term "event" shall be taken to include branch instructions processes, exceptions and interrupts that may be generated within or outside the processor.

For the purposes of the present specification, the term "processor" shall be taken to refer to any machine that is capable of executing a sequence of instructions (e.g., macro- or microinstructions), and shall be taken to include general purpose microprocessors, special purpose microprocessors, graphics controllers, audio controllers, multi-media controllers, microcontrollers or network controllers. Further, the term "processor" shall be taken to refer to, among other things, Complex Instruction Set Computers (CISC), Reduced Instruction Set Computers (RISC), or Very Long Instruction Word (VLIW) processors.

Further, the term "clearing point" shall be taken to include any instructions provided in an instruction stream (including a microinstruction or macroinstruction stream) by way of a flow marker or other instruction, of a location in the instruction stream at which an event may be handled or processed.

The term "instruction" shall be taken to include a macroinstruction or a microinstruction.

Certain exemplary embodiments of the present invention are described as being implemented primarily in either hardware or software. It will nonetheless be appreciated by those skilled in the art that many features may readily be implemented in hardware, software or a combination of hardware and software.

Software (e.g., either microinstructions and macroinstructions) for implementing embodiments of the invention may reside, completely or at least partially, within a main memory accessible by a processor and/or within the processor itself (e.g., in a cache or a microcode sequencer). For example, event handlers and state machines may be implemented in microcode dispatched from a microcode sequencer. Software may further be transmitted or received via the network interface device.

For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Processor Pipeline

FIG. 1 is a high-level block diagram illustrating one embodiment of processor pipeline 10. The pipeline 10 includes a number of pipe stages, commencing with a fetch pipe stage 12 at which instructions (e.g., macroinstructions) are retrieved and fed into the pipeline 10. For example, a macroinstruction may be retrieved from a cache memory that is integral with the processor, or closely associated therewith, or may be retrieved from an external main memory via a processor bus. From the fetch pipe stage 12, the macroinstructions are propagated to a decode pipe stage 14, where macroinstructions are translated into microinstructions (also termed "microcode") suitable for execution within the processor. The microinstructions are then propagated downstream to an allocate pipe stage 16, where processor resources are allocated to the various microinstructions according to availability and need. The microinstructions are then executed at an execute stage 18 before being retired, or "written-back" (e.g., committed to an architectural state) at a retire pipe stage 20.

Microprocessor Architecture

Figure 2:
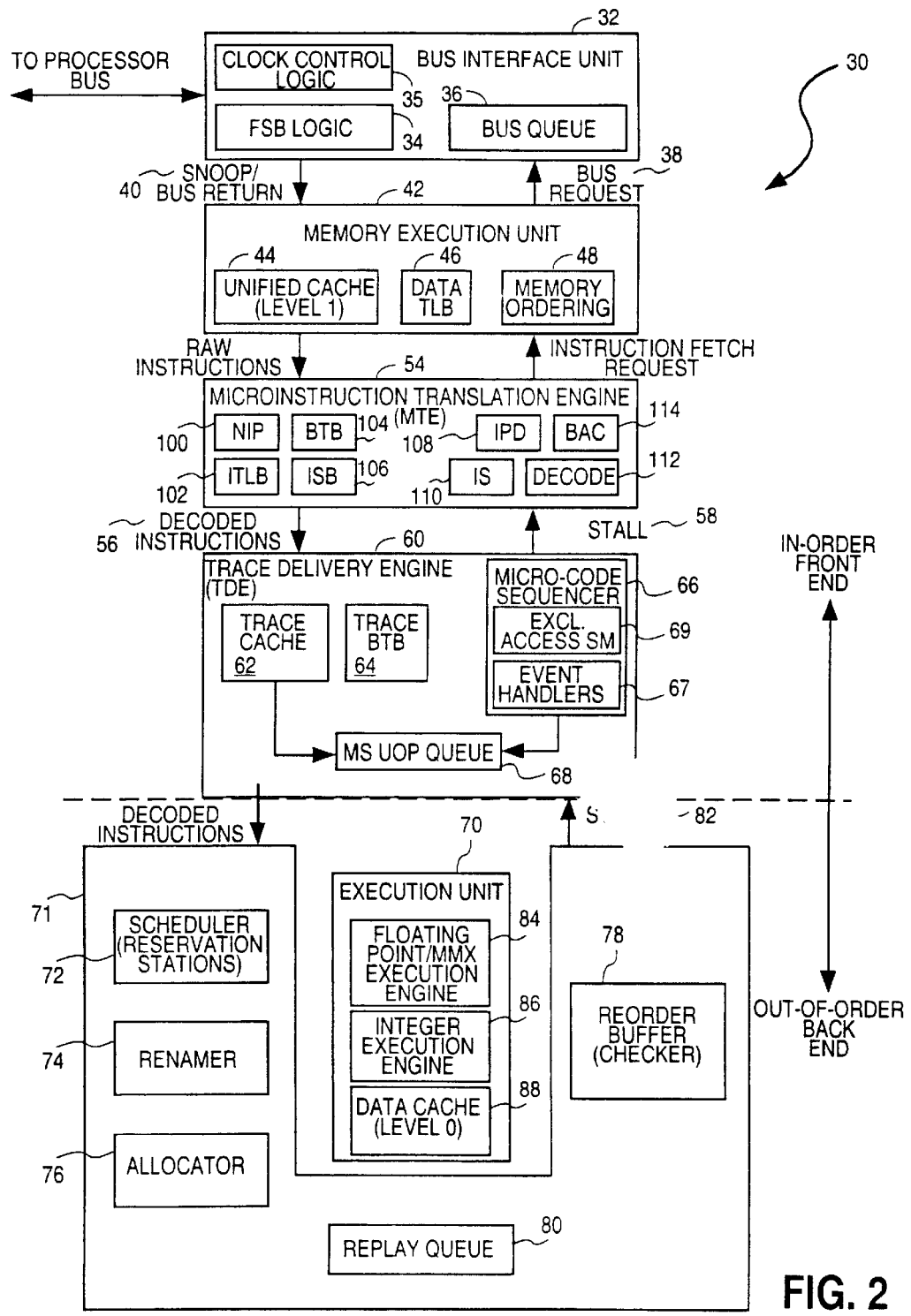
FIG. 2 is a block diagram illustrating an exemplary embodiment of a processor, in the form of a general-purpose multithreaded microprocessor.

FIG. 2 is a block diagram illustrating an embodiment of a processor 30, in the form of a general-purpose microprocessor. The processor 30 is described below as being a multithreaded (MT) processor, and is accordingly able to process multiple instruction threads (or contexts). However, a number of the teachings provided below in the specification are not specific to a multithreaded processor, and may find application in a single threaded processor. In an exemplary embodiment, the processor 30 may comprise an Intel Architecture (IA) microprocessor that is capable of executing the Intel Architecture instruction set. Examples of such a microprocessors are the Pentium Pro® processor and the Pentium III® microprocessor, manufactured by Intel Corporation of Santa Clara, Calif.

In one embodiment, the processor 30 comprises an in-order front end and an out-of-order back end. The in-order front end includes a bus interface unit 32, which functions as the conduit between the processor 30 and other components (e.g., main memory) of a computer system within which the processor 30 may be employed. To this end, the bus interface unit 32 couples the processor 30 to a processor bus (not shown) via which data and control information may be received at and propagated from the processor 30. The bus interface unit 32 includes Front Side Bus (FSB) logic 34 that controls communications over the processor bus. The bus interface unit 32 further includes a bus queue 36 that provides a buffering function with respect to communications over the processor bus. The bus interface unit 32 is shown to receive bus requests 38 from, and to send snoops or bus returns to, a memory execution unit 42 that provides a local memory capability within the processor 30. The memory execution unit 42 includes a unified data and instruction cache 44, a data Translation Lookaside Buffer (TLB) 46, and memory ordering buffer 48. The memory execution unit 42 receives instruction fetch requests 50 from, and delivers raw instructions 52 (i.e., coded macroinstructions) to, a microinstruction translation engine 54 that translates the received macroinstructions into a corresponding set of microinstructions.

The microinstruction translation engine 54 effectively operates as a trace cache "miss handler" in that it operates to deliver microinstructions to a trace cache 62 in the event of a trace cache miss. To this end, the microinstruction translation engine 54 functions to provide the fetch and decode pipe stages 12 and 14 in the event of a trace cache miss. The microinstruction translation engine 54 is shown to include a next instruction pointer (NIP) 100, an instruction Translation Lookaside Buffer (TLB) 102, a branch predictor 104, an instruction streaming buffer 106, an instruction pre-decoder 108, instruction steering logic 110, an instruction decoder 112, and a branch address calculator 114. The next instruction pointer 100, TLB 102, branch predictor 104 and instruction streaming buffer 106 together constitute a branch prediction unit (BPU) 99. The instruction decoder 112 and branch address calculator 114 together comprise an instruction translate (IX) unit 113.

The next instruction pointer 100 issues next instruction requests to the unified cache 44. In the exemplary embodiment where the processor 30 comprises a multithreaded microprocessor capable of processing two threads, the next instruction pointer 100 may include a multiplexer (MUX) (not shown) that selects between instruction pointers associated with either the first or second thread for inclusion within the next instruction request issued therefrom. In one embodiment, the next instruction pointer 100 will interleave next instruction requests for the first and second threads on a cycle-by-cycle ("ping pong") basis, assuming instructions for both threads have been requested, and instruction streaming buffer 106 resources for both of the threads have not been exhausted. The next instruction pointer requests may be for 16, 32 or 64-bytes depending on whether the initial request address is in the upper half of a 32-byte or 64-byte aligned line. The next instruction pointer 100 may be redirected by the branch predictor 104, the branch address calculator 114 or by the trace cache 62, with a trace cache miss request being the highest priority redirection request.

When the next instruction pointer 100 makes an instruction request to the unified cache 44, it generates a two-bit "request identifier" that is associated with the instruction request and functions as a "tag" for the relevant instruction request. When returning data responsive to an instruction request, the unified cache 44 returns the following tags or identifiers together with the data:

1. The "request identifier" supplied by the next instruction pointer 100;
2. A three-bit "chunk identifier" that identifies the chunk returned; and
3. A "thread identifier" that identifies the thread to which the returned data belongs.

Next instruction requests are propagated from the next instruction pointer 100 to the instruction TLB 102, which performs an address lookup operation, and delivers a physical address to the unified cache 44. The unified cache 44 delivers a corresponding macroinstruction to the instruction streaming buffer 106. Each next instruction request is also propagated directly from the next instruction pointer 100 to the instruction streaming buffer 106 so as to allow the instruction streaming buffer 106 to identify the thread to which a macroinstruction received from the unified cache 44 belongs. The macroinstructions from both first and second threads are then issued from the instruction streaming buffer 106 to the instruction pre-decoder 108, which performs a number of length calculation and byte marking operations with respect to a received instruction stream (of macroinstructions). Specifically, the instruction pre-decoder 108 generates a series of byte marking vectors that serve, among other things, to demarcate macroinstructions within the instruction stream propagated to the instruction steering logic 110.

The instruction steering logic 110 then utilizes the byte marking vectors to steer discrete macroinstructions to the instruction decoder 112 for the purposes of decoding. Macroinstructions are also propagated from the instruction steering logic 110 to the branch address calculator 114 for the purposes of branch address calculation. Microinstructions are then delivered from the instruction decoder 112 to the trace delivery engine 60.

During decoding, flow markers are associated with each microinstruction into which a macroinstruction is translated. A flow marker indicates a characteristic of the associated microinstruction and may, for example, indicate the associated microinstruction as being the first or last microinstruction in a microcode sequence representing a macroinstruction. The flow markers include a "beginning of macroinstruction" (BOM) and an "end of macroinstruction" (EOM) flow markers. According to the present invention, the decoder 112 may further decode the microinstructions to have shared resource multiprocessor (SHRMP) flow markers and synchronization (SYNC) flow markers associated therewith. Specifically, a shared resource flow marker identifies a microinstruction as a location within a particular thread at which the thread may be interrupted (e.g., re-started or paused) with less negative consequences than elsewhere in the thread. The decoder 112, in an exemplary embodiment of the present invention, is constructed to mark microinstructions that comprise the end or the beginning of a parent macroinstruction with a shared resource flow marker as well as intermittent points in longer microcode sequences. A synchronization flow marker identifies a microinstruction as a location within a particular thread at which the thread may be synchronized with another thread responsive to, for example, a synchronization instruction within the other thread. For the purposes of the present specification, the term "synchronize" shall be taken to refer to the identification of at least a first point in at least one thread at which processor state may be modified with respect to that thread and/or at least one further thread with a reduced or lower disruption to the processor, relative to a second point in that thread or in another thread.

The decoder 112, in an exemplary embodiment of the present invention, is constructed to mark microinstructions that are located at selected macroinstruction boundaries where state shared among threads coexisting in the same processor can be changed by one thread without adversely impacting the execution of other threads.

From the microinstruction translation engine 54, decoded instructions (i.e., microinstructions) are sent to a trace delivery engine 60. The trace delivery engine 60 includes a trace cache 62, a trace branch predictor (BTB) 64, a microcode sequencer 66 and a microcode (uop) queue 68. The trace delivery engine 60 functions as a microinstruction cache, and is the primary source of microinstructions for a downstream execution unit 70. By providing a microinstruction caching function within the processor pipeline, the trace delivery engine 60, and specifically the trace cache 62, allows translation work done by the microinstruction translation engine 54 to be leveraged to provide increased microinstruction bandwidth. In one exemplary embodiment, the trace cache 62 may comprise a 256 set, 8 way set associate memory. The term "trace", in the present exemplary embodiment, may refer to a sequence of microinstructions stored within entries of the trace cache 62, each entry including pointers to preceding and proceeding microinstructions comprising the trace. In this way, the trace cache 62 facilitates high-performance sequencing in that the address of the next entry to be accessed for the purposes of obtaining a subsequent microinstruction is known before a current access is complete. Traces, in one embodiment, may be viewed as "blocks" of instructions that are distinguished from one another by trace heads, and are terminated upon encountering an indirect branch or by reaching one of many present threshold conditions, such as the number of conditioned branches that may be accommodated in a single trace or the maximum number of total microinstructions that may comprise a trace.

The trace cache branch predictor 64 provides local branch predictions pertaining to traces within the trace cache 62. The trace cache 62 and the microcode sequencer 66 provide microinstructions to the microcode queue 68, from where the microinstructions are then fed to an out-of-order execution cluster. The microcode sequencer 66 is furthermore shown to include a number of event handlers 67, embodied in microcode, that implement a number of operations within the processor 30 in response to the occurrence of an event such as an exception or an interrupt. The event handlers 67, as will be described in further detail below, are invoked by an event detector 188 included within a register renamer 74 in the back end of the processor 30.

The processor 30 may be viewed as having an in-order front-end, comprising the bus interface unit 32, the memory execution unit 42, the microinstruction translation engine 54 and the trace delivery engine 60, and an out-of-order back-end that will be described in detail below.

Microinstructions dispatched from the microcode queue 68 are received into an out-of-order cluster 71 comprising a scheduler 72, a register renamer 74, an allocator 76, a reorder buffer 78 and a replay queue 80. The scheduler 72 includes a set of reservation stations, and operates to schedule and dispatch microinstructions for execution by the execution unit 70. The register renamer 74 performs a register renaming function with respect to hidden integer and floating point registers (that may be utilized in place of any of the eight general purpose registers or any of the eight floating-point registers, where a processor 30 executes the Intel Architecture instruction set). The allocator 76 operates to allocate resources of the execution unit 70 and the cluster 71 to microinstructions according to availability and need. In the event that insufficient resources are available to process a microinstruction, the allocator 76 is responsible for asserting a stall signal 82, that is propagated through the trace delivery engine 60 to the microinstruction translation engine 54, as shown at 58. Microinstructions, which have had their source fields adjusted by the register renamer 74, are placed in a reorder buffer 78 in strict program order. When microinstructions within the reorder buffer 78 have completed execution and are ready for retirement, they are then removed from a reorder buffer and retrieved in an inorder manner (i.e., according to an original program order). The replay queue 80 propagates microinstructions that are to be replayed to the execution unit 70.

The execution unit 70 is shown to include a floating-point execution engine 84, an integer execution engine 86, and a level 0 data cache 88. In one exemplary embodiment in which is the processor 30 executes the Intel Architecture instruction set, the floating point execution engine 84 may further execute MMX® instructions and Streaming SIMD (Single Instruction, Multiple Data) Extensions (SSEs).

Multithreading Implementation

In the embodiment of the processor 30 illustrated in FIG. 2, there may be limited duplication or replication of resources to support a multithreading capability, and it is accordingly necessary to implement some degree of resource sharing among threads. The resource sharing scheme employed, it will be appreciated, is dependent upon the number of threads that the processor is able simultaneously to process. As functional units within a processor typically provide some buffering (or storage) functionality and propagation functionality, the issue of resource sharing may be viewed as comprising (1) storage and (2) processing/propagating bandwidth sharing components. For example, in a processor that supports the simultaneous processing of two threads, buffer resources within various functional units may be statically or logically partitioned between two threads. Similarly, the bandwidth provided by a path for the propagation of information between two functional units must be divided and allocated between the two threads. As these resource sharing issues may arise at a number of locations within a processor pipeline, different resource sharing schemes may be employed at these various locations in accordance with the dictates and characteristics of the specific location. It will be appreciated that different resource sharing schemes may be suited to different locations in view of varying functionalities and operating characteristics.

Figure 3:
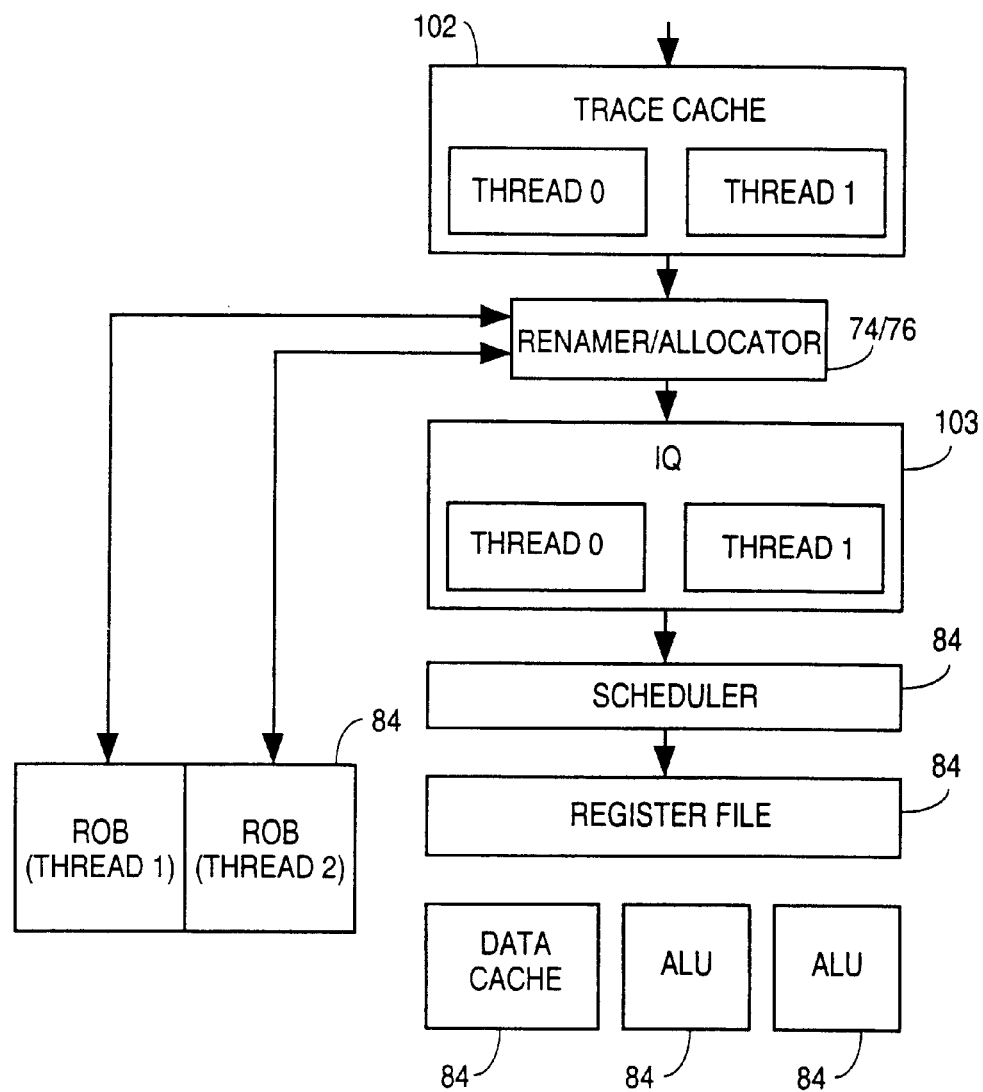
FIG. 3 is a block diagram illustrating selected components of an exemplary multithreaded microprocessor, and specifically depicts various functional units that provide a buffering (or storage) capability as being logically partitioned to accommodate multiple thread.

FIG. 3 is a block diagram illustrating selected components for one embodiment of the processor 30 illustrated in FIG. 2, and depicts various functional units that provide a buffering capability as being logically partitioned to accommodate two threads (i.e., thread 0 and thread 1). The logical partitioning for two threads of the buffering (or storage) and processing facilities of a functional unit may be achieved by allocating a first predetermined set of entries within a buffering resource to a first thread and allocating a second predetermined set of entries within the buffering resource to a second thread. However, in alternative embodiments, buffering can also be dynamically shared. Specifically, this may be achieved by providing two pairs of read and write pointers, a first pair of read and write pointers being associated with a first thread and a second pair of read and write pointers being associated with a second thread. The first set of read and write pointers may be limited to a first predetermined number of entries within a buffering resource, while the second set of read and write pointers may be limited to a second predetermined number of entries within the same buffering resource. In the illustrated embodiment, the instruction streaming buffer 106, the trace cache 62, and an instruction queue 103 are shown to each provide a storage capacity that is logically partitioned between the first and second threads.

The Out-of-Order Cluster (71)

Figure 4:
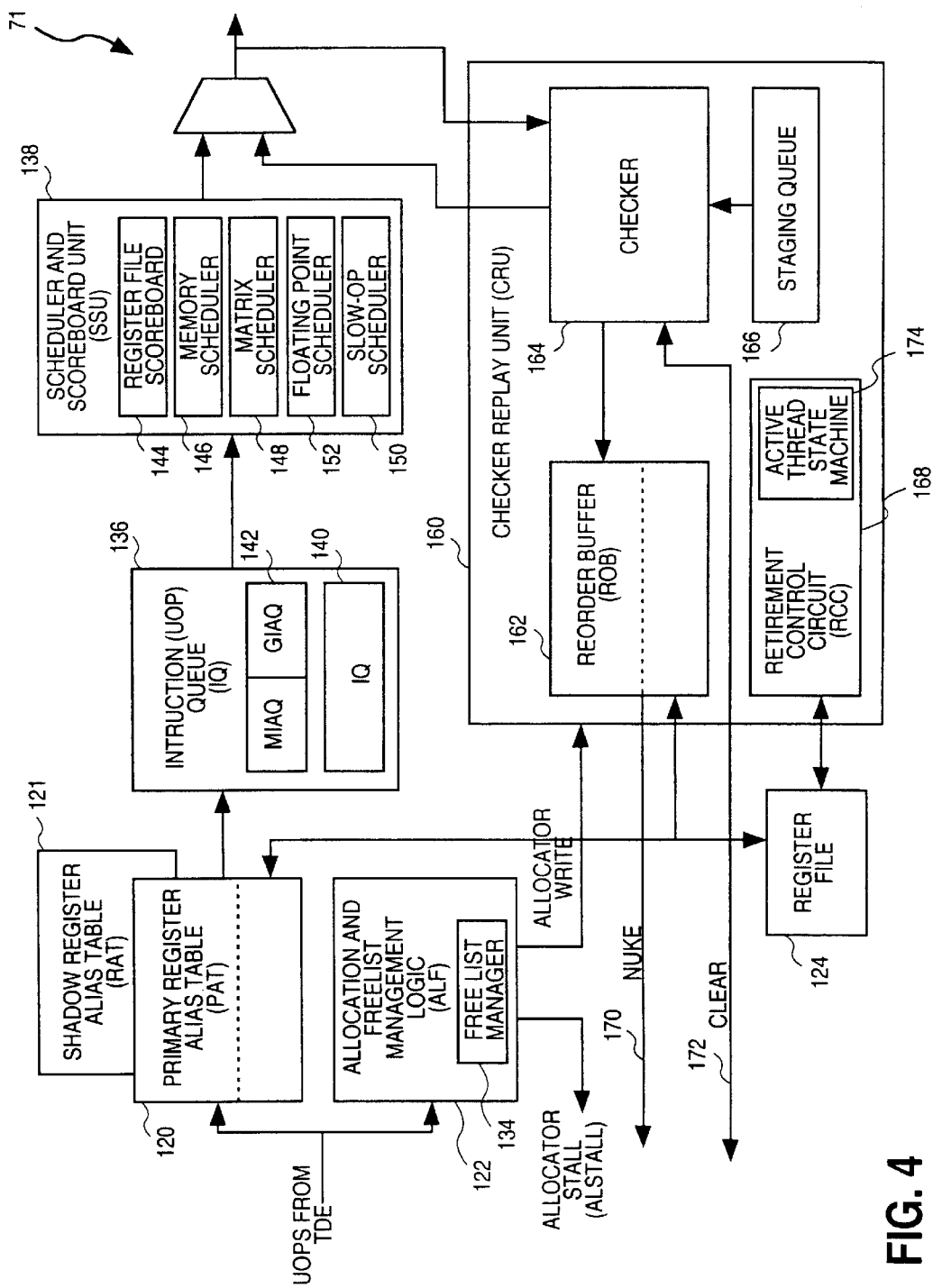
FIG. 4 is a block diagram illustrating an out-of-order cluster, according to one embodiment.

FIG. 4 is a block diagram illustrating further details of one embodiment of the out-of-order cluster 71. The cluster 71 provides the reservation station, register renaming, replay and retirement functionality within the processor 30. The cluster 71 receives microinstructions from the trace delivery engine 60, allocates resources to these microinstructions, renames source and destination registers for each microinstruction, schedules microinstructions for dispatch to the appropriate execution units 70, handles microinstructions that are replayed due to data speculation, and then finally retires microinstructions (i.e., commits the microinstructions to a permanent architectural state).

Microinstructions received at the cluster 71 are simultaneously delivered to a register alias table 120 and allocation and free list management logic 122. The register alias table 120 is responsible for translating logical register names to physical register addresses used by the scheduler 72 and the execution units 70. More specifically, referring to FIG. 5, the register alias table 120 renames integer, floating point and segment registers maintained within a physical register file 124. The register file 124 is shown to include 126 physical registers that are aliased to eight (8) architectural registers. In the illustrated embodiment, the register alias table 120 is shown to include both a front-end table 126 and a back-end table 128 for utilization by the respective front and back ends of the processor 30. Each entry within the register alias table 120 is associated with, or viewed as, an architectural register, and includes a pointer 130 that points to a location within the register file 124 at which the data attributed to the relevant architectural register is stored. In this way, the challenges provided by a legacy microprocessor architecture that specifies a relatively small number of architectural registers may be addressed.

The allocation and free list management logic 122 is responsible for resource allocation and state recovery within the cluster 71. The logic 122 allocates the following resources to each microinstruction:

1. A sequence number, which is given to each microinstruction to track the logical order thereof within a thread as the microinstruction is processed within the cluster 71. The sequence number attributed to each microinstruction is stored together with status information for the microinstruction within a table 180 (shown below in FIG. 10) within the reorder buffer 162.
2. A free list management entry, that is given to each microinstruction to allow the history of the microinstruction to be tracked and recovered in the case of a state recovery operation.
3. A reorder buffer (ROB) entry, that is indexed by the sequence number.
4. A physical register file 124 entry (known as a "marble") within which the microinstruction may store useful results.
5. A load buffer (not shown) entry.
6. A stall buffer (not shown) entry.
7. An instruction queue entry (e.g., to either a memory instruction queue or a general instruction address queue, as will be described below).

In the event of the logic 122 is not able to obtain the necessary resources for a received sequence of microinstructions, the logic 122 will request that the trace delivery engine 60 stall the delivery of microinstructions until sufficient resources become available. This request is communicated by asserting the stall signal 82 illustrated in FIG. 2.

Figure 5:
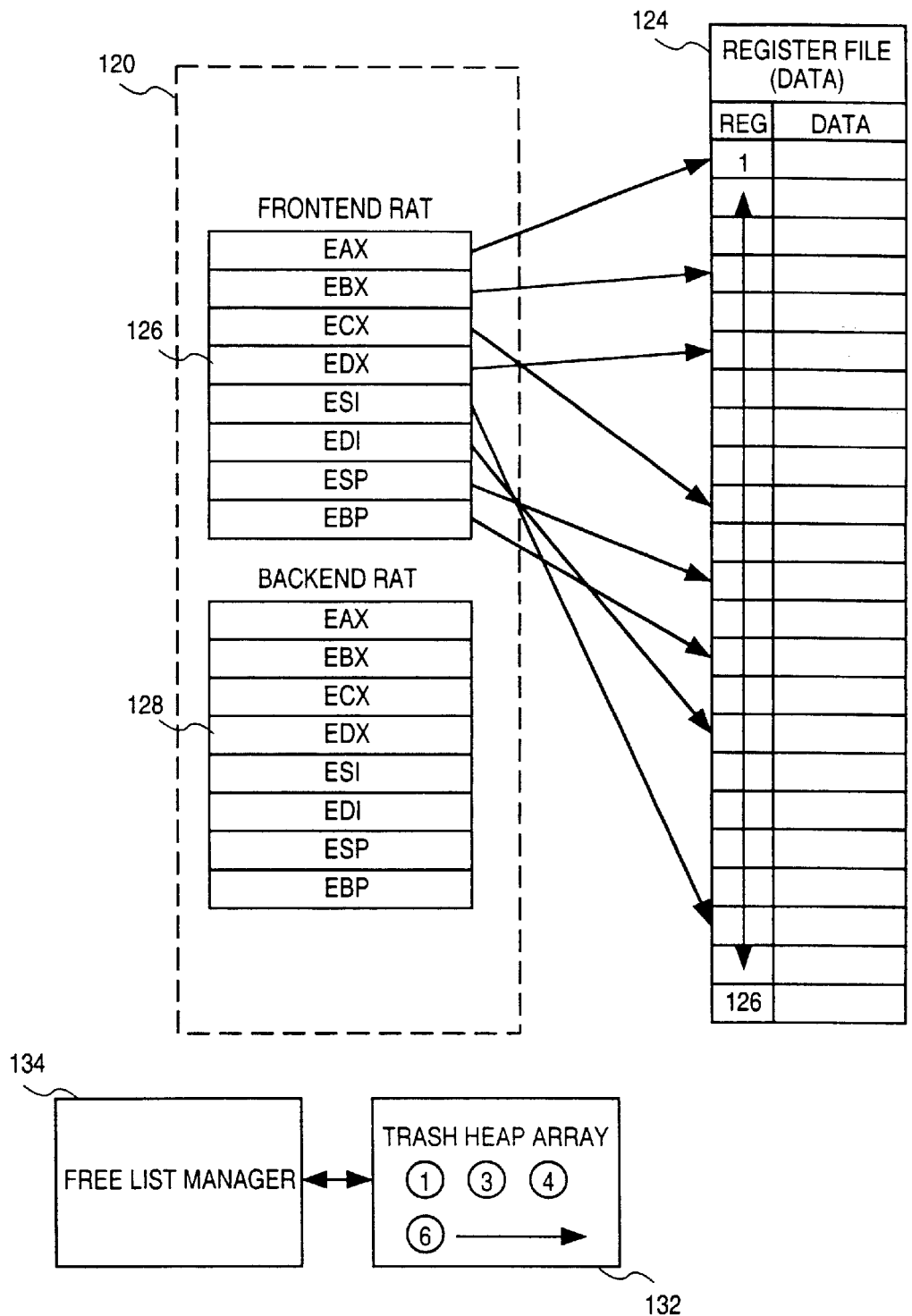
FIG. 5 is a diagrammatic representation of a register alias table and a register file and utilized within one embodiment.

Regarding the allocation of an entry within the register file 124 to a microinstruction, FIG. 5 shows a trash heap array 132 that maintains a record of entries within the register file 124 that have not been allocated to architectural registers (i.e., for which they are no pointers within the register alias table 120). The logic 122 accesses the trash heap array 132 to identify entries within the register file 124 that are available to allocation to a received microinstruction. The logic 122 is also responsible for re-claiming entries within the register file 124 that become available.

The logic 122 further maintains a free list manager (FLM) 134 to enable tracking of architectural registers. Specifically, the free list manager 134 maintains a history of the changes to the register alias table 120 as microinstructions are allocated thereto. The free list manager 134 provides the capability to "unwind" the register alias table 120 to point to a non-speculative state given a misprediction or an event. The free list manager 134 also "ages" the storage of data in the entries of the register file 124 to guarantee that all the state information is current. Finally, at retirement, physical register identifiers are transferred from the free list manager 134 to the trash heap array 132 for allocation to a further microinstruction.

An instruction queue unit 136 delivers microinstructions to a scheduler and scoreboard unit (SSU) 138 in sequential program order, and holds and dispatches microinstruction information needed by the execution units 70. The instruction queue unit 136 may include two distinct structures, namely an instruction queue (IQ) 140 and an instruction address queue (IAQ) 142. The instruction address queues 142 are small structures designed to feed critical information (e.g., microinstruction sources, destinations and latency) to the unit 138 as needed. The instruction address queue 142 may furthermore comprise a memory instruction address queue (MIAQ) that queues information for memory operations and a general instruction address queue (GIAQ) that queues information for non-memory operations. The instruction queue 140 stores less critical information, such as opcode and immediate data for microinstructions. Microinstructions are de-allocated from the instruction queue unit 136 when the relevant microinstructions are read and written to the scheduler and scoreboard unit 138.

The scheduler and scoreboard unit 138 is responsible for scheduling microinstructions for execution by determining the time at which each microinstructions sources may be ready, and when the appropriate execution unit is available for dispatch. The unit 138 is shown in FIG. 4 to comprise a register file scoreboard 144, a memory scheduler 146, a matrix scheduler 148, a slow-microinstruction scheduler 150 and a floating point scheduler 152.

The unit 138 determines when the source register is ready by examining information maintained within the register file scoreboard 144. To this end, the register file scoreboard 144, in one embodiment, has 256 bits that track data resource availability corresponding to each register within the register file 124. For example, the scoreboard bits for a particular entry within the register file 124 may be cleared upon allocation of data to the relevant entry or a write operation into the unit 138.

The memory scheduler 146 buffers memory-class microinstructions, checks resource availability, and then schedules memory-class microinstructions. The matrix scheduler 148 comprises two tightly-bound arithmetic logic unit (ALU) schedulers that allow the scheduling of dependent back-to-back microinstructions. The floating point scheduler 152 buffers and schedules floating point microinstructions, while the slow microinstruction scheduler 150 schedules microinstructions not handled by the above mentioned schedulers.

A checker, replay and retirement unit (CRU) 160 is shown to include a reorder buffer 162, a checker 164, a staging queue 166 and a retirement control circuit 168. The unit 160 has three main functions, namely a checking function, a replay function and a retirement function. Specifically, the checker and replay functions comprise re-executing microinstructions which have incorrectly executed. The retirement function comprises committing architectural in-order state to the processor 30. More specifically, the checker 164 operates to guarantee that each microinstruction has properly executed the correct data. In the event that the microinstruction has not executed with the correct data (e.g., due to a mispredicted branch), then the relevant microinstruction is replayed to execute with the correct data.

The reorder buffer 162 is responsible for committing architectural state to the processor 30 by retiring microinstructions in program order. A retirement pointer 182, generated by a retirement control circuit 168, indicates an entry within the reorder buffer 162 that is being retired. As the retirement pointer 182 moves past a microinstruction within an entry, the corresponding entry within the free list manager 134 is then freed, and the relevant register file entry may now be reclaimed and transferred to the trash heap array 132. The retirement control circuit 168 is also shown to implement an active thread state machine 171, the purpose and functioning of which will be explained below. The retirement control circuit 168 controls the commitment of speculative results held in the reorder buffer 162 to the corresponding architectural state within the register file 124.

The reorder buffer 162 is also responsible for handling internal and external events, as will be described in further detail below. Upon the detection of an event occurrence by the reorder buffer 162, a "nuke" signal 170 is asserted. The nuke signal 170 has the effect of flushing all microinstructions from the processor pipeline that are currently in transit. The reorder buffer 162 also provides the trace delivery engine 60 with an address from which to commence sequencing microinstructions to service the event (i.e., from which to dispatch an event handler 67 embodied in microcode).

The Reorder Buffer (162)

FIG. 6A is a block diagram illustrating further details regarding an exemplary embodiment of reorder buffer 162, that is logically partitioned to service multiple threads within the multithreaded processor 30. Specifically, the reorder buffer 162 is shown to include a reorder table 180 that may be logically partitioned to accommodate entries for first and second threads when the processor 30 is operating in a multithreaded mode. When operating in a single thread mode, the entire table 180 may be utilized to service the single thread. The table 180 comprises, in one embodiment, a unitary storage structure that, when operating in multi-threaded mode, is referenced by two (2) retirement pointers 182 and 183 that are limited to predetermined and distinct sets of entries within the table 180. Similarly, when operating in a single thread mode, the table 180 is referenced by a single retirement pointer 182. The table 180 includes an entry corresponding to each entry of the register file 124, and stores a sequence number and status information in the form of fault information, a logical destination address, and a valid bit for each microinstruction data entry within the register file 124. The entries within the table 180 are each indexed by the sequence number that constitutes a unique identifier for each microinstruction. Entries within the table 180 are, in accordance with the sequence numbers, allocated and de-allocated in a sequential and in-order manner. In addition to other flow markers, the table 180 is furthermore shown to store a shared resource flow marker 184 and a synchronization flow marker 186 for each microinstruction.

The reorder buffer 162 includes an event detector 188 that is coupled to receive interrupt requests in the form of interrupt vectors and also to access entries within the table 180 referenced by the retirement pointers 182 and 183. The event detector 188 is furthermore shown to output the nuke signal 170 and the clear signal 172.

Assuming that a specific microinstruction for a specific thread (e.g., thread 0) experiences no branch misprediction, exception or interrupt, then the information stored in the entry within the table 180 for the specific instruction will be retired to the architectural state when the retirement pointer 182 or 183 is incremented to address the relevant entry. In this case, an instruction pointer calculator 190, which forms part of the retirement control circuit 168, increments the macro-or microinstruction pointer to point to (1) a branch target address specified within the corresponding entry within the register file 124 or to (2) the next macro-or microinstruction if a branch is not taken.

If a branch misprediction has occurred, the information is conveyed through the fault information field to the retirement control circuit 168 and the event detector 188. In view of the branch misprediction indicated through the fault information, the processor 30 may have fetched at least some incorrect instructions that have permeated the processor pipeline. As entries within the table 180 are allocated in sequential order, all entries after the mispredicted branch microinstruction are microinstructions tainted by the mispredicted branch instruction flow. In response to the attempted retirement of a microinstruction for which a mispredicted branch is registered within the fault information, the event detector 188 asserts the clear signal 172, that clears the entire out-of-order back end of the processor of all state, and accordingly flushes the out-of-order back end of all state resulting from instructions following a misprediction microinstruction. The assertion of the clear signal 172 also blocks the issue of subsequently fetched microinstructions that may be located within the in-order front-end of the processor 30.

Within the retirement control circuit 168, upon notification of a mispredicted branch through the fault information of a retiring microinstruction, the IP calculator 190 insures that instruction pointers 179 and/or 181 are updated to represent the correct instruction pointer value. Based upon whether the branch is to be taken or not taken, the IP calculator 190 updates the instruction pointers 179 and/or 181 with the result data from the register file entry corresponding to the relevant entry of the table 180, or increments the instruction pointers 179 and 181 when the branch was not taken.

The event detector 188 also includes a number of registers 200 for maintaining information regarding events detected for each of multiple threads. The registers 200 includes an event information register 202, a pending event register 204, an event inhibit register 206, and unwind register 208 and a pin state register 210. Each of the registers 202-210 is capable of storing information pertaining to an event generated for a specific thread. Accordingly, event information for multiple threads may be maintained by the registers 200.

Figure 6B:
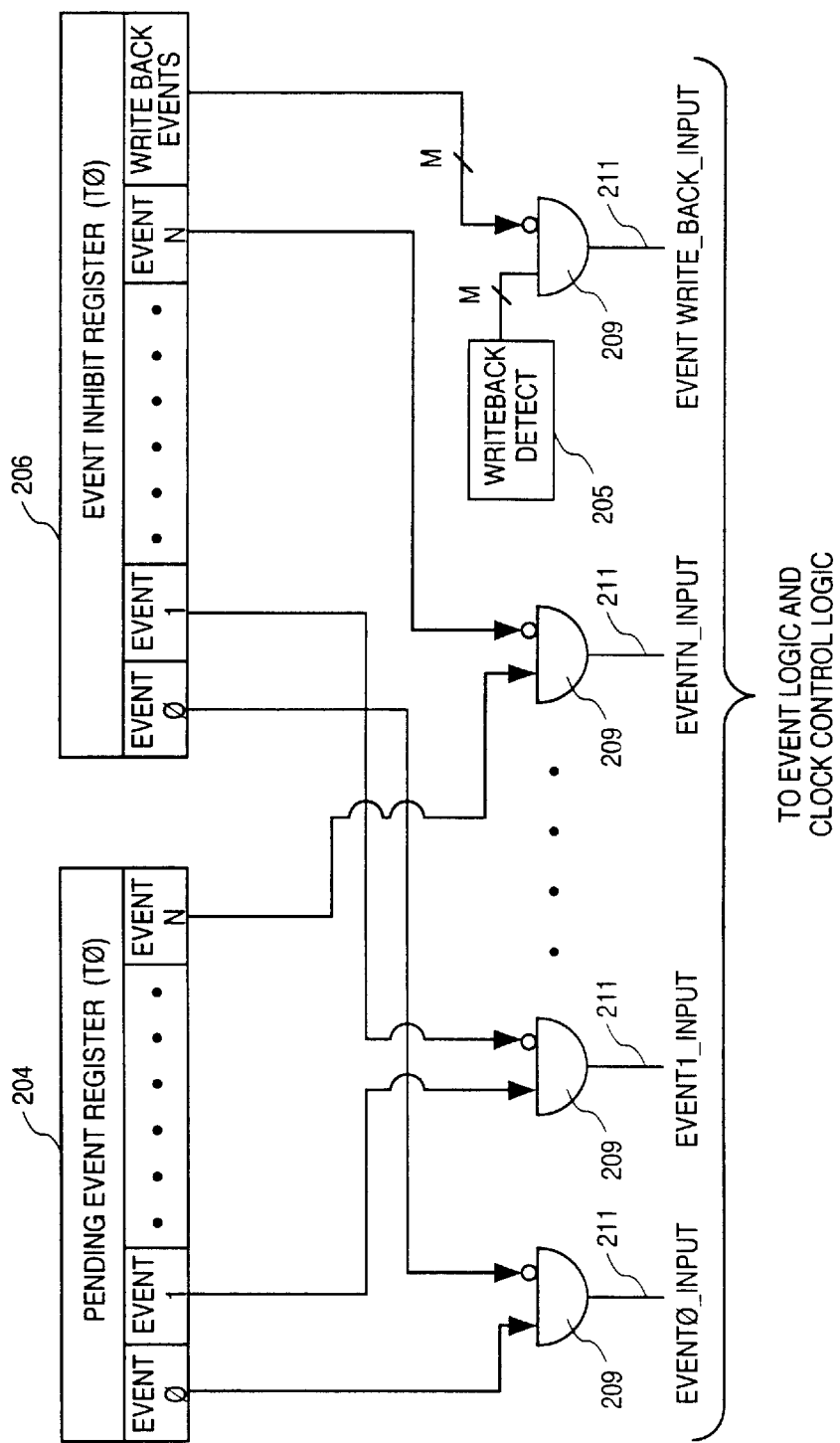
FIG. 6B is a diagrammatic representation of a pending event register and an event inhibit register, according to one embodiment.

FIG. 6B is a schematic illustration of an exemplary pending event register 204 and an exemplary event inhibit register 206 for a first thread (e.g., T0).

Pending event and event inhibit registers 204 and 206 are provided for each thread supported within the multithreaded processor 30. Distinct registers 204 and 206 may be provided for each thread, or alternatively a single physical register may be logically partitioned to support multiple threads.

Figure 8:
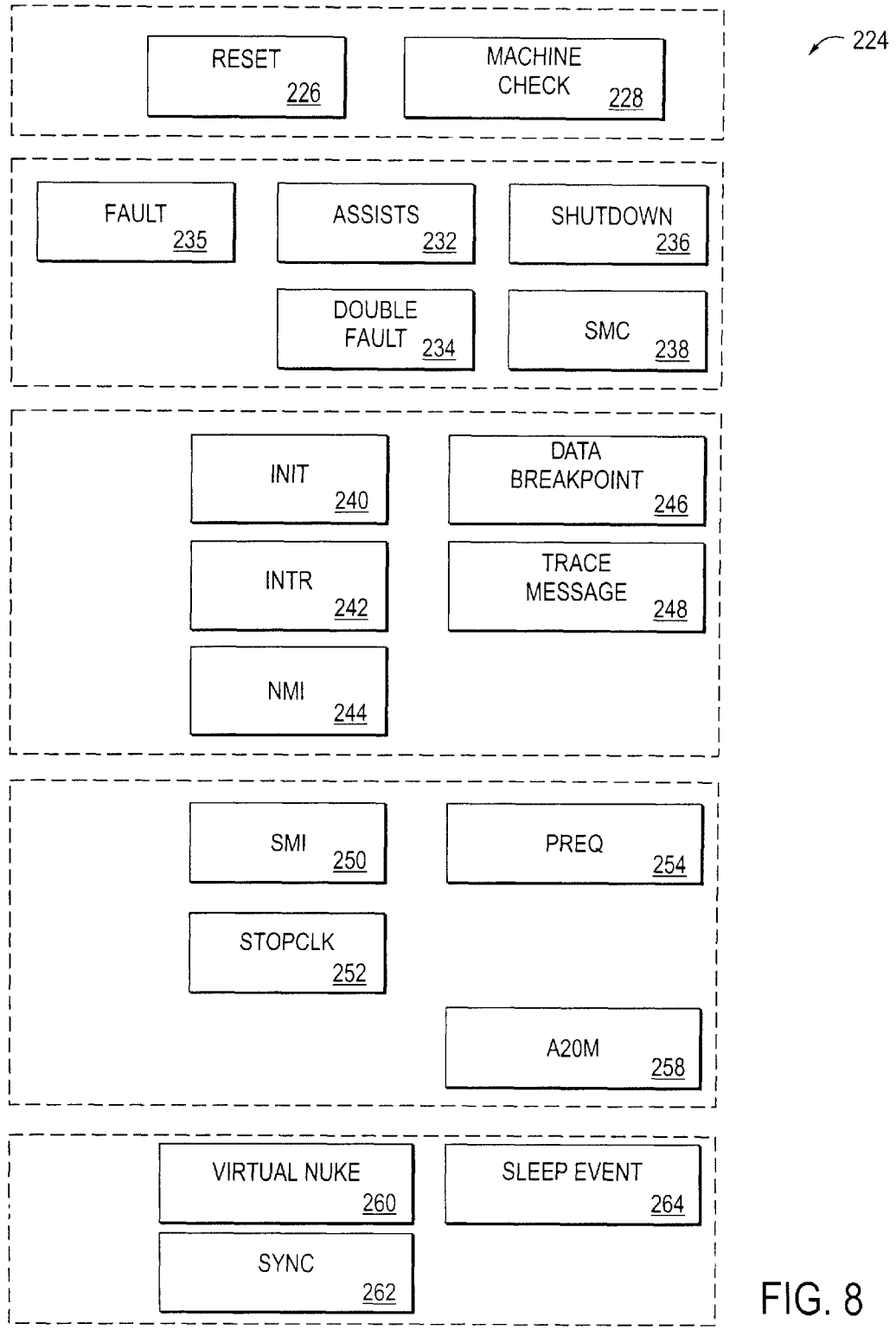
FIG. 8 is a diagrammatic representation of a number of exemplary events that may be detected by an event detector, according to one embodiment, implemented within a multithreaded processor.

The exemplary pending event register 204 contains a bit, or other data item, for each event type that is registered by the event detector 188 (e.g., the events described below with reference to FIG. 8). These events may constitute internal events, which are generated internally within the processor 30, or external events generated outside the processor 30 (e.g., pin events that are received from the processor bus). The pending event register 204 for each thread, in the illustrated embodiment, does not include a bit for writeback event, as such events are not thread specific and accordingly are not "queued" in the pending event register. To this end, the event detector 188 may include writeback detect logic 205 that asserts a writeback signal on the detection of a writeback event. The bits within the pending event register 204 for each thread are set by the event detector 188 that triggers a latch which sets the appropriate bit within the pending event register 204. In an exemplary embodiment, a set bit associated with a predetermined event, within the pending event register 204 provides an indication, as will be described below, that an event of the relevant type is pending.

The event inhibit register 206 for each thread similarly contains a bit, or other data structure, for each event type that is recognized by the event detector 188, this bit being either set or reset (i.e., cleared) to record an event as being a break event with respect to the specific thread. The respective bits within an event inhibit register 206 are set by a control register write operation, that utilizes a special microinstruction that modifies non-renamed state within the processor 30. A bit within an event inhibit register 206 may similarly be reset (or cleared) utilizing a control register write operation.

An exemplary processor may also have certain modes in which bits in the event inhibit register 206 may be set to inhibit select events within the respective modes.

Bits for a specific event type maintained within each of the pending event and event inhibit registers 204 and 206 for a specific thread are outputted to an AND gate 209, which in turn outputs an event detected signal 211 for each event type when the contents of the registers 204 and 206 indicate that the relevant event type is pending and not inhibited. For example, where an event type is not inhibited, upon the registering of an event within the pending event register 204, the event will immediately be signaled as being detected by the assertion of the event detected signal 211 for the relevant event type. On the other hand, should the event type be inhibited by the contents of the event inhibit register 206, the event occurrence will be recorded within the pending event register 204, but the event detected signal 211 will only be asserted if the appropriate bit within the event inhibit register 206 is cleared while the event is still recorded as pending within the register 204. Thus, an event may be recorded within the pending event register 204, but the event detected signal 211 for the relevant event occurrence may only be signaled at some later time when the inhibiting of the event for the specific thread is removed.

The event detected signals 211 for each event type for each thread are fed to event handling logic (event prioritization and selection logic) and clock control logic, as will further be described below.

An event handler for a specific event is responsible for clearing the appropriate bit within the pending event register 204 for a specific thread once the handling of the event has been completed. In an alternative embodiment, the pending event register may be cleared by hardware.

Event Occurrences and Event Handling within a Multithreaded Processor Environment Events within the multithreaded processor 30 may be detected and signaled from a variety of sources. For example, the in-order front-end of the processor 30 may signal an event, and the execution units 70 may likewise signal an event. Events may comprise interrupts and exceptions. Interrupts are events that are generated outside the processor 30, and may be initiated from a device to the processor 30 via a common bus (not shown). Interrupts may cause the flow of control to be directed to a microcode event handler 67. Exceptions may be loosely classified as faults, traps and assist, among others. Exceptions are events that are typically generated within the processor 30.

Events are communicated directly to the event detector 188 within the reorder buffer 162, responsive to which the event detector 188 performs a number of operations pertaining to the thread for which, or against which, the event was generated. At a high-level, the event detector 188, responsive to the detection of an event, suspends retirement of microinstructions for the thread, writes the appropriate fault information into the table 180, asserts the nuke signal 170, invokes an event handler 67 to process the event, determines a restart address, and then restarts the fetching of microinstructions. The events may be communicated directly to the event detector 188 in the form of an interrupt request (or interrupt sector) or through fault information recorded within the reorder table 180 for an instruction of either a first or second thread that is retiring.

The assertion of the nuke signal 170 has the effect of clearing both the inorder front-end and the out-of-order back-end of the multithreaded processor 30 of state. Specifically, numerous functional units, but not necessarily all, are cleared of state and microinstructions responsive to assertion of the nuke signal 170. Some parts of the memory order buffer 48 and bus interface unit 32 are not cleared (e.g., retired but not committed stores, bus snoops, etc.) The assertion of the nuke signal 170 further stalls instruction fetching by the front-end and also stalls the sequencing of microinstructions into the microcode queue 68.

While this operation can be performed with impunity within a single-threaded multiprocessor, or a multiprocessor executing the single thread, where multiple threads are extant and being processed within a multithreaded processor 30, the presence of other threads cannot be ignored when addressing the event occurrence pertaining to a single thread. Accordingly, the present invention includes a method and apparatus for handling an event within a multithreaded processor that takes cognizant of the processing and presence of multiple threads within the multithreaded processor 30 when an event for a single thread occurs.

Figure 7A:
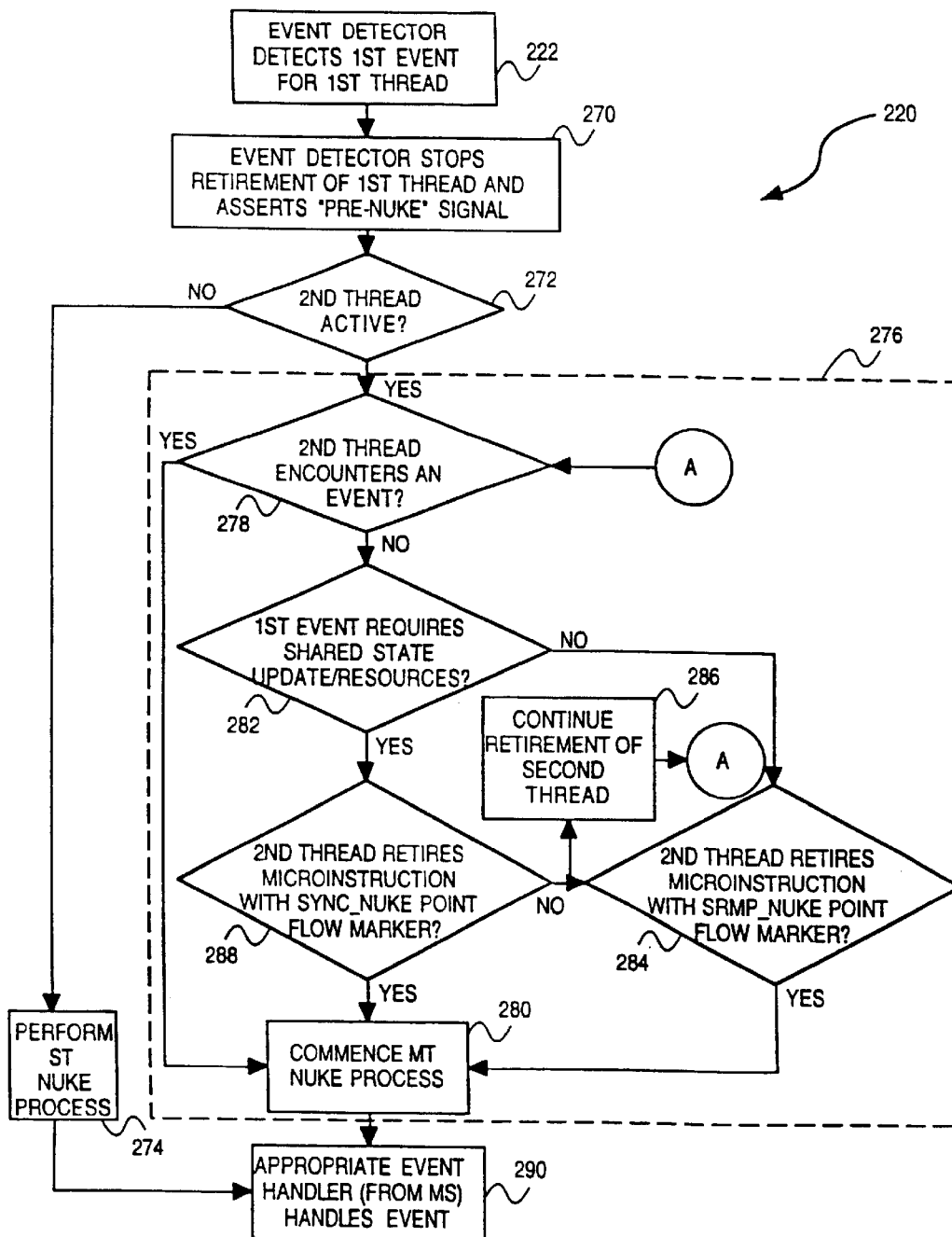
FIG. 7A is a flow chart illustrating a method, according to one embodiment, of processing an event within a multithreaded processor.

FIG. 7A is a flowchart illustrating a method 220, according to one embodiment of the present invention, of processing an event occurrence within a multithreaded processor 30. The method 220 commences at block 222 with the detection by the event detector 188 of a first event for a first thread. FIG. 8 is a diagrammatic representation of a number of exemplary events 224 that may be detected by the event detector 188 at block 222. The events represented in FIG. 8 have been loosely grouped according to characteristics of the responses to the events 224. A first group of events includes a RESET event 226 and a MACHINE CHECK event 228 that are signaled by the event detector 188 to multiple threads within a multithreaded processor 30, in the manner described below, immediately upon detection and cause all threads to go to the same event handler 67 at the same time. A second group of events includes a FAULT event 230, an ASSIST event 232 (a type of ASSIST event known as MONuke is particularly amenable to the "soft nuke" process described below), a DOUBLE FAULT event 234, a SHUTDOWN event 236 and a SMC (Self Modifying Code) event 238 that are each reported on the retirement of the microinstruction of a specific thread that signaled the event. Specifically, the event detector 188 will detect an event of the second group upon the retirement of a microinstruction for which fault information indicates a fault condition. The detection of an event of the second group is signaled by the event detector 188 only to the thread for which the relevant event was generated.

A third group of events include an INIT (short reset) event 240, an INTR (local interrupt) event 242, a NMI (non-maskable interrupt) event 244, a DATA BREAKPOINT event 246, a TRACE MESSAGE event 248 and an A20M (address wrap-around) event 250. Events of the third group are reported on the retirement of a microinstruction having an accept interrupt or accept trap flow marker. The detection of event of the third group is signaled by the event detector 188 only to the thread for which the relevant event was generated.

A fourth group of events include a SMI (system management interrupt) event 250, a STOP CLOCK event 252, and a PREQ (probe request) event 254. The events of the fourth group are signaled to all threads extant within the multithreaded processor 30, and are reported when any one of multiple threads retires a microinstruction having an appropriate interrupt flow marker. No synchronization is implemented between multiple threads responsive to any of the events of the fourth group.

A fifth group of events, according to one embodiment, are specific to a multithreaded processor architecture and are implemented within the described embodiment to address a number of considerations that are particular to a multithreaded processor environment. The fifth group of events include a VIRTUAL NUKE event 260, a SYNCHRONIZATION event 262 and a SLEEP event 264.

The VIRTUAL NUKE event 260 is an event that is registered with respect to a second thread when (1) a first thread within the multithreaded processor 30 has a pending event (e.g., any of the events described above is pending), (2) the second thread has no pending events (other than the event 260), and (3) a microinstruction having either a shared resource flow marker 184 or a synchronization flow marker 186 is retired by the reorder buffer 162. A VIRTUAL NUKE event 260 has the effect of invoking a virtual nuke event handler that restarts execution of the second thread at the microinstruction subsequent to the retired microinstruction having the flow marker 184 or 186.

The SYNCHRONIZATION event 262 is signaled by microcode when a particular thread (e.g., a first thread) is required to modify a shared state or resource within the multithreaded processor 30. To this end, the microcode sequencer 66 inserts a synchronization microinstruction into the flow for the first thread and, in order to avoid a deadlock situation, marks the "synchronization microinstruction" with both a shared resource flow marker 184 and a synchronization flow marker 186. The SYNCHRONIZATION event 262 is only detected (or registered) upon the retirement of the synchronization microinstruction for the first thread, and upon the retirement of a microinstruction for the second thread that has a synchronization flow marker 186 associated therewith. A SYNCHRONIZATION event 262 has the effect of invoking a synchronization event handler that restarts execution of the first thread at an instruction pointer stored in a microcode temporary register. Further details regarding the handling of a SYNCHRONIZATION event 262 are provided below. The second thread performs the virtual NUKE 260.

The SLEEP event 264 is an event that causes a relevant thread to transition from an active state to an inactive (or sleep) state. The inactive thread may then again be transitioned from the inactive to the active state by an appropriate BREAK event. The nature of the BREAK event that transitions the thread back to the active state is dependent upon the SLEEP event 264 that transitioned the thread to the inactive state. The entry to and exiting from an active state by threads is detailed below.

Figure 9:
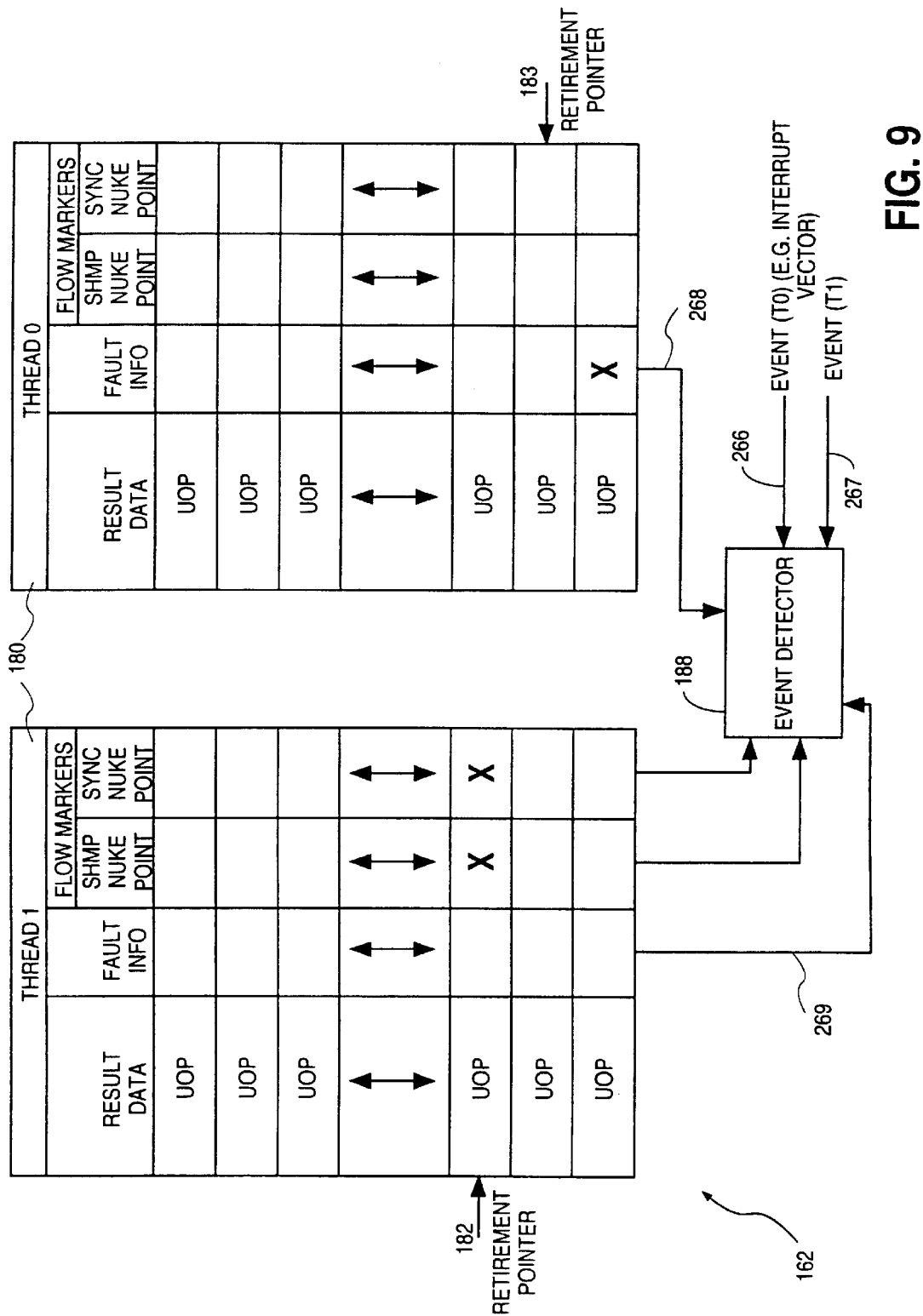
FIGS. 9 and 10 are respective block diagrams showing exemplary content of a reorder table, within an exemplary reorder buffer such as that illustrated in FIG. 6A.

FIG. 9 is a block diagram showing an example of content of the reorder table 180 within the reorder buffer 162 that shall be described below for the purposes of explaining event and clearing point (also termed "nuke point") detection within an exemplary embodiment of the present invention. The detection of any one of the above events by the event detector 188 at block 222 may occur responsive to an event 266 communicated to the event detector 188 from an internal source within the multithreaded processor 30 or from an external source outside the processor 30. An example of such an event 266 communication may be an interrupt vector. Alternatively, an event occurrence may be communicated to the event detector 188 by fault information 268 for a microinstruction of a particular thread (e.g., thread 1) that is being retired and accordingly identified by the retirement pointer 182. It will be noted that, for external events, there is one (1) signal per thread (e.g., signals 266 and 267 respectively). For internal events, the reorder buffer 162 entry containing the thread dictates the thread to which the fault pertains by its position (e.g., T0 vs. T1). Upon the detection of an event, the event detector 188 stores event information (e.g., event type, event source, etc.) concerning the particular event within the event information register 202, and furthermore registers a pending event for the relevant thread in the pending event register 204. As described above, the registering of a pending event within the pending event register 204 for the relevant thread comprises setting a bit, associated with the particular event, within the register 204. It will furthermore be noted that the event may be effectively detected, by assertion of an appropriate event detected signal 211, if the event is not inhibited by a bit setting within the event inhibit register 206 for the relevant thread and, in some cases, a microinstruction includes an appropriate flow marker.

Returning now to the flowchart shown in FIG. 7A, following the detection of the first event for the first thread at block 222, the event detector 188 stops retirement of the first thread at block 270 and asserts a "pre-nuke" signal 169. The pre-nuke signal 169 is asserted to avoid a deadlock situation in which the first thread dominates the instruction pipeline to the exclusion of the second thread. Specifically, should the second thread be excluded from access to the instruction pipeline, the conditions with respect to the second thread which are required to commence a multithreaded nuke operation may not occur. The prenuke signal 169 is accordingly propagated to the front-end of the processor, and specifically to the memory execution unit 42, to starve the processor pipeline of microinstructions constituting the first thread for which the event was detected. The starving of the processor pipeline may, merely for example, be performed by disabling the prefetching of instruction and Self Modifying Code (SMC) operations performed by the memory execution unit 42 or other components of the front-end. In summary, by stopping the retirement of microinstructions of the first thread, and/or by halting or substantially reducing, the feeding of microinstructions with the first thread into the processor pipeline, the second thread is given preference in the processor and the probability of a deadlock situation is reduced.

At decision box 272, a determination is made as to whether a second thread is active within the multithreaded processor 30, and accordingly being retired by the reorder buffer 162. If no second thread is active, the method 220 proceeds directly to block 274, where a first type of clearing operation termed a "nuke operation" is performed. The determination as to whether a particular thread is active or inactive may be performed with reference to the active thread state machine 171 maintained by the retirement control circuit 168. The nuke operation commences with the assertion of the nuke signal 170 that has the effect of clearing both the in-order front-end and the out-of-order back-end of the multithreaded processor 30 of state, as described above. As only the first thread is active, no consideration needs to be given to the effect of the nuke operation on any other threads that may be present and extant within the multithreaded processor 30.

On the other hand, if it is determined that a second thread is active within the multithreaded processor 30 at decision box 272, the method 220 proceeds to perform a series of operations that constitute the detection of a clearing point (or "nukeable" point) for the second thread at which a nuke operation may be performed with reduced negative consequences for the second thread. The nuke operation performed following the detection of a clearing point is the same operation as performed at block 274, and accordingly clears the multithreaded processor 30 of state (i.e., state for both the first and second threads). The clearing of state includes microinstruction "draining" operations described elsewhere in the specification. In an exemplary embodiment disclosed in the present application, the nuke operation performed following the detection of a clearing point does not discriminate between the state maintained for a first thread and the state maintained for a second thread within the multithreaded processor 30. In an alternative embodiment, the nuke operation performed following the detection of a clearing point may clear state for only a single thread (i.e., the thread for which the event was detected). Where a significant degree of resource sharing occurs within a multithreaded processor 30 and where such shared resources are dynamically partitioned and un-partitioned to service multiple threads, the clearing of state for a single thread is particularly complex. However, this alternative embodiment may require increasingly complex hardware.

Following the positive determination at decision box 272, a further determination is made at decision box 278 as to whether the second thread has encountered an event. Such an event may comprise any of the events discussed above, except the VIRTUAL NUKE event 260. This determination is again made by the event detector 188 responsive to an event signal 266 or a fault information signal 269 for the second thread. Information concerning any event encountered by the second thread is stored in the portion of the event information register 202 dedicated to the second thread, and the event occurrence is registered within the pending event register 204.

Figure 10:
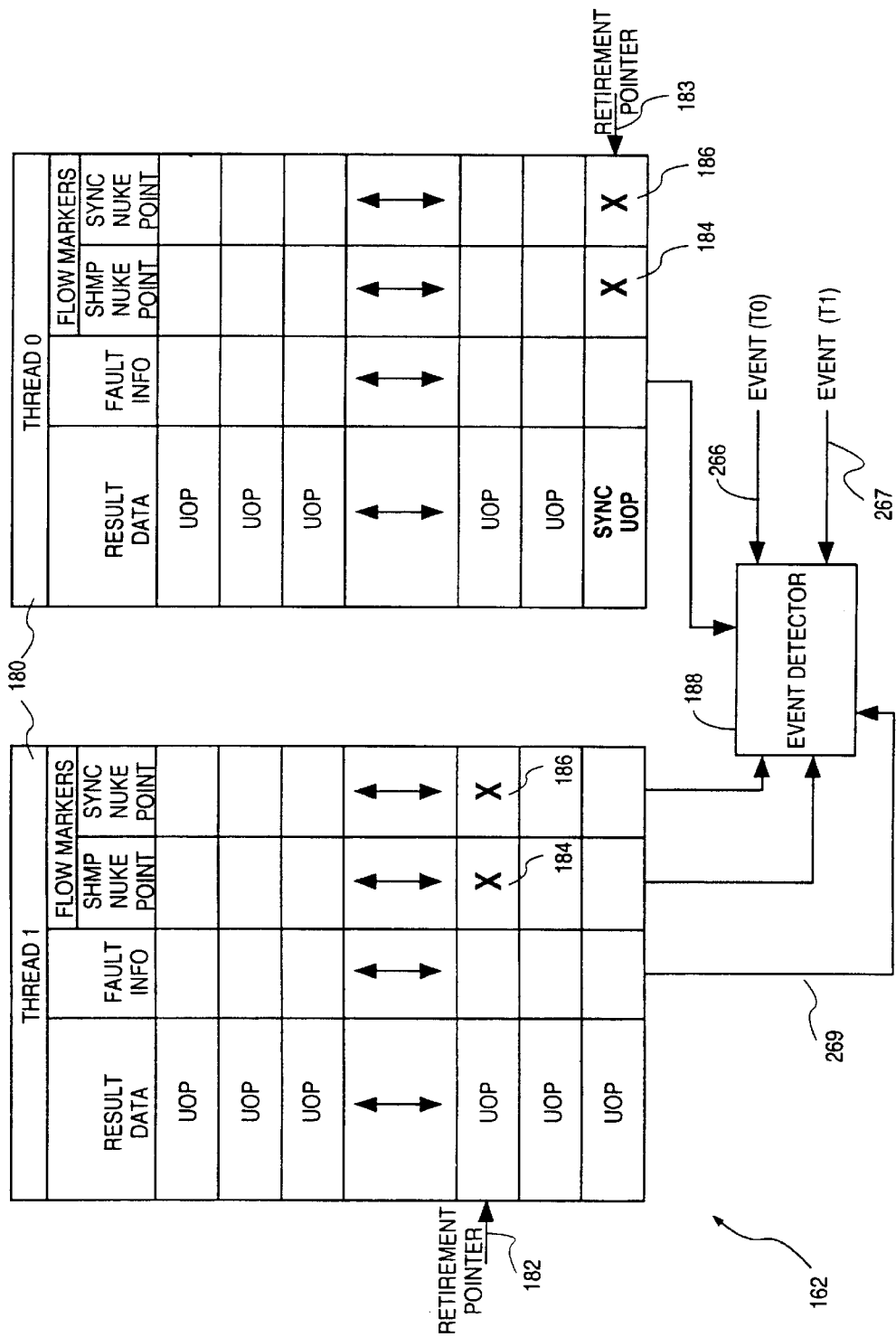

If the second thread has independently encountered an event, then the method proceeds directly to block 280, where a multithreaded nuke operation is performed to clear the multithreaded processor 30 of state. Alternatively, should the second thread not have encountered an event, a determination is made at decision box 282 whether the first event encountered for the first thread requires that a shared state, or shared resources, be modified to handle the first event. For example, where the first event comprises a SYNCHRONIZATION event 262 as discussed above, this indicates that the first thread requires access to a shared state resource. The SYNCHRONIZATION event 262 may be identified by the retirement of a synchronization microinstruction for the first thread that has both shared resource and synchronization flow markers 184 and 186 associated therewith. FIG. 10 is a block diagram, similar to that shown in FIG. 9, that shows exemplary content for the reorder table 180. The portion of the table 180 allocated to the first thread (e.g., thread 0), is shown to include a synchronization microinstruction that is referenced by the retirement pointer 182. The synchronization microinstruction is furthermore shown to have a shared resource flow marker 184 and a synchronization flow marker 186 associated therewith. The retirement of the illustrated synchronization microinstruction will be registered by the event detector 188 as the occurrence of a SYNCHRONIZATION event 262.

If the first event for the first thread (e.g., thread 0) is determined not to modify a shared state or resource, the method 220 proceeds to decision box 284, where a determination is made as to whether the second thread (e.g., thread 1) is retiring a microinstruction that has a shared resource flow marker 184 associated therewith. Referring to FIG. 9, the retirement pointer 182 for the thread 1 is shown to reference a microinstruction having both a shared resource flow marker 184 and a synchronization flow marker 186. In this situation, the condition presented at decision box 284 will have been fulfilled, and the method 220 accordingly proceeds to block 280, where the multithreaded nuke operation is performed. Alternatively, should the retirement pointer 182 for the second thread (e.g., thread 1) not reference a microinstruction having either a shared resource flow marker 184 or a synchronization flow marker 186, the method proceeds to block 286, where retirement of the second thread continues by advancement of the retirement pointer 182. From the block 286, the method 220 loops back to the decision box 278, where a determination is again made whether the second thread has encountered an event.

If, at decision box 282, it is determined that the handling of the first event for the first thread (e.g., thread 0) requires the modification of a shared state resource, the method 220 proceeds to decision box 288, where a determination is made whether the second thread (e.g., thread 1) is retiring a microinstruction that has a synchronization flow marker 186 associated therewith. If so, then the multithreaded nuke operation is performed at block 280. If not, the retirement of microinstruction for the second thread continues at block 286 until either an event is encountered for the second thread or the retirement pointer 182 for the second thread indexes a microinstruction having a synchronization flow marker 186 associated therewith.

Following the commencement of the nuke operation at block 280, at block 290, an appropriate event handler 67, implemented in microcode and sequenced from the microcode sequencer 66, proceeds to handle the relevant event.

Virtual Nuke Event

Figure 7B:
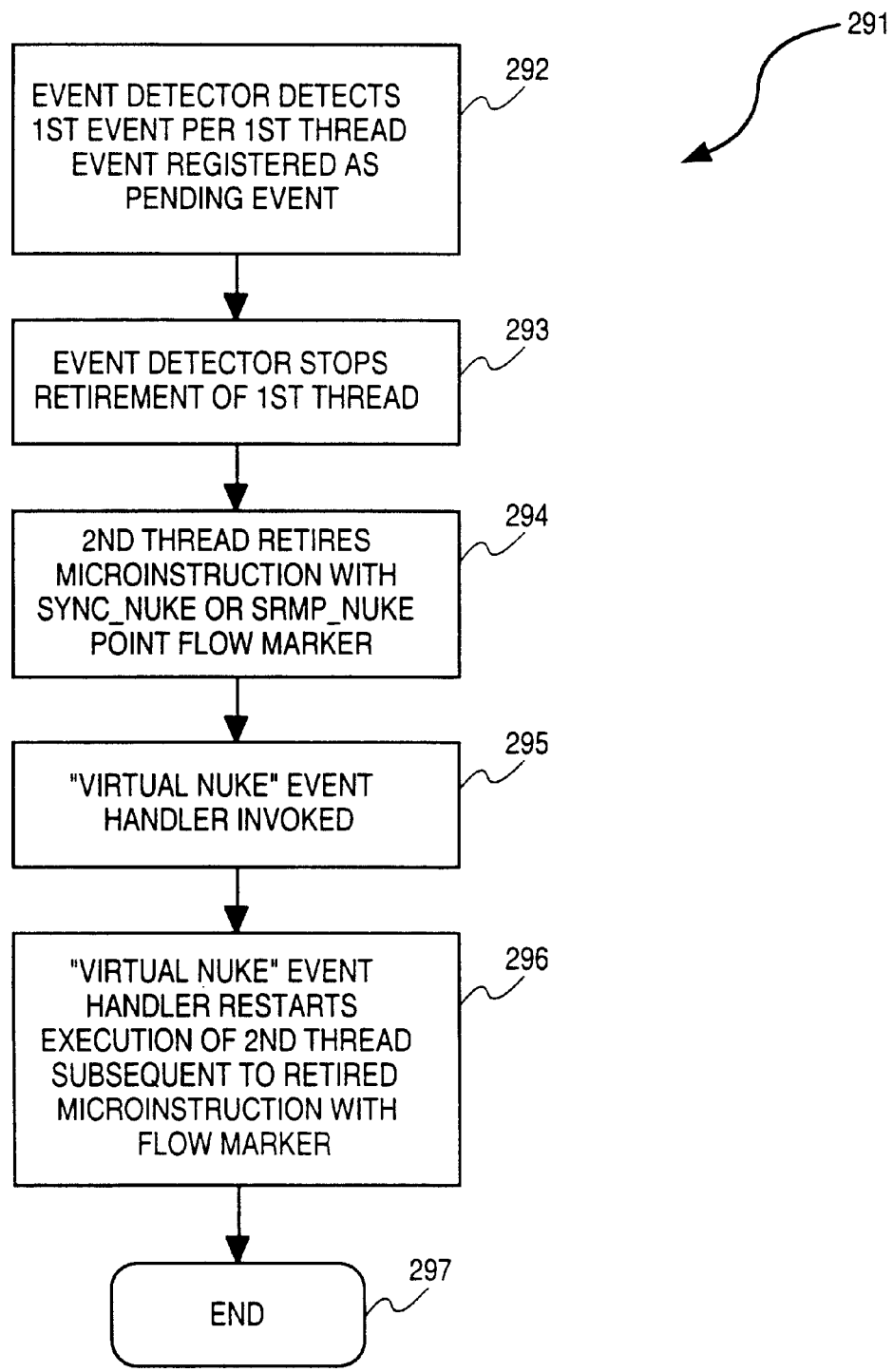
FIG. 7B is a flow chart illustrating a method, according to one embodiment, of handling a "virtual nuke" event within a multithreaded processor.

As described above, the VIRTUAL NUKE event 260 is handled in a slightly different manner than other events. To this end, FIG. 7B is a flow chart illustrating a method 291, according to an exemplary embodiment, of detecting and handling a VIRTUAL NUKE event 260. The method 291 assumes that no events for a second thread are currently pending (i.e., recorded in a pending register for the second thread).

The method 291 begins at block 292 with the detection by the event detector 188 of a first event for the first thread. Such an event could be any one of the events discussed above with reference to FIG. 8.

At block 293, the event detector 188 stops retirement of the first thread. At block 294, the event detector 188 detects retirement of a microinstruction with either a shared resource flow marker 184 or a synchronization flow marker. At block 295, a "virtual nuke" handler is invoked from the microcode sequencer 66. The "virtual nuke" event handler, at block 296, restarts execution of the second thread at a microinstruction subsequent to the microinstruction retired above at block 294. The method 291 then ends at block 297.

The Nuke Operation

Figure 11A:
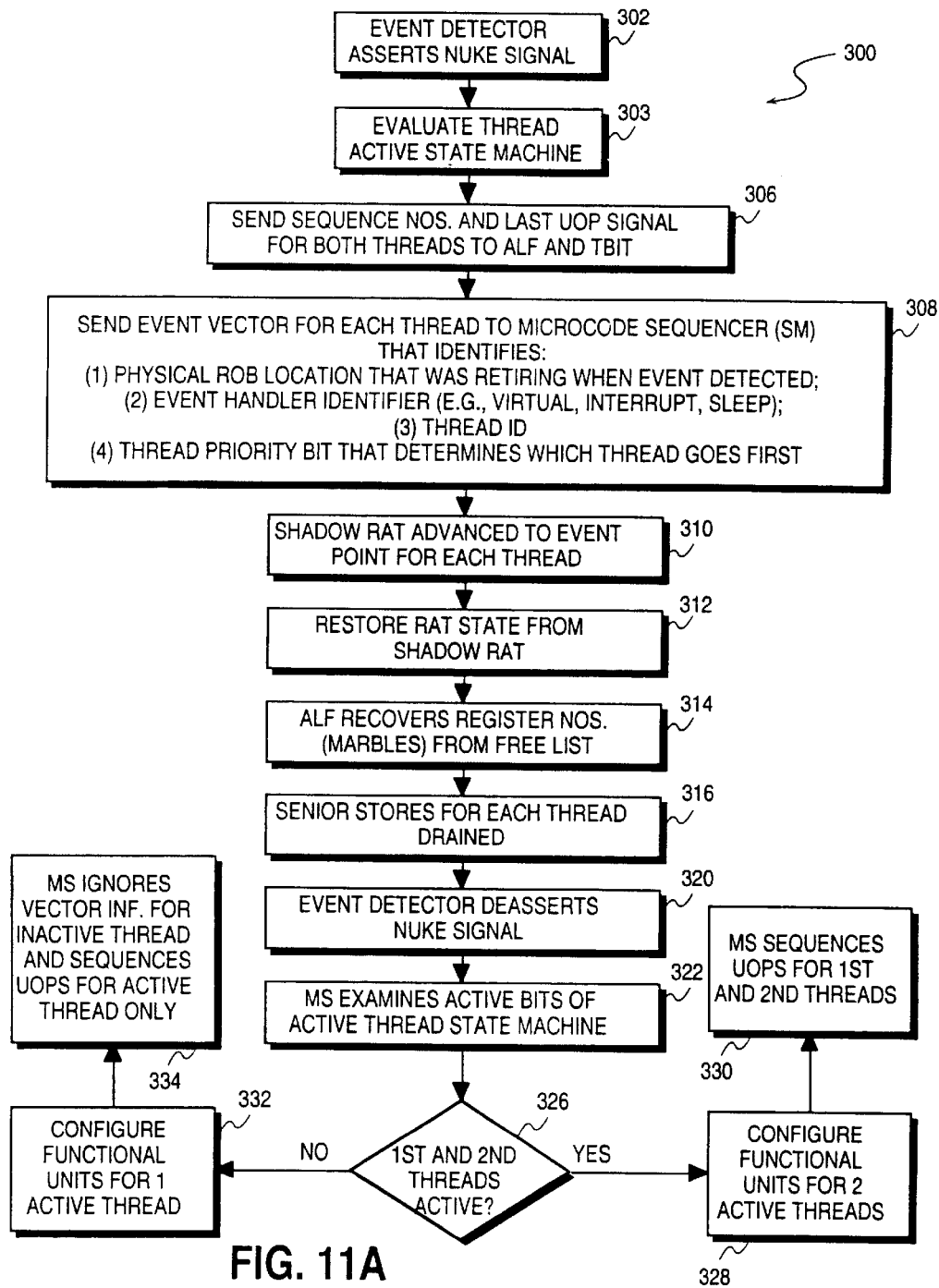
FIG. 11A is a flow chart illustrating a method, according to an exemplary embodiment, of performing a clearing (or nuke) operation within a multithreaded processor supporting at least first and second threads.
Figure 12:
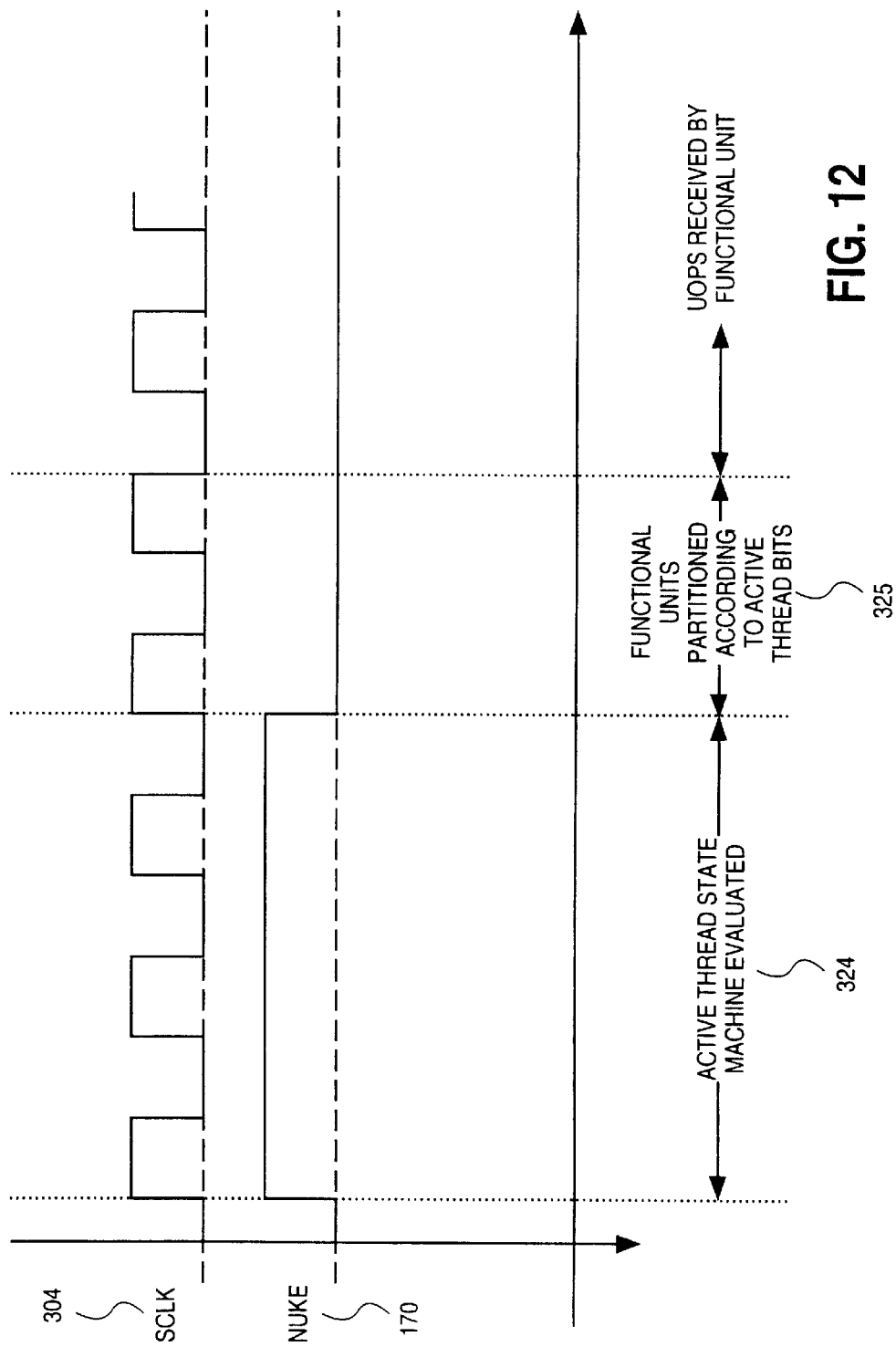
FIG. 12 is a timing diagram illustrating the assertion of a nuke signal, according to one embodiment.

FIG. 11A is a flowchart illustrating a method 300, according to exemplary embodiment, of performing a clearing (or nuke) operation within a multithreaded processor supporting at least first and second threads. The method 300 commences at block 302 with the assertion of the nuke signal 170 by the event detector 188 responsive to the occurrence and detection of an event. The nuke signal 170 is communicated to numerous functional units within the multithreaded processor 30, and the assertion and de-assertion thereof defines a window within which activities in preparation for the clearing of state and the configuration of functional units are performed. FIG. 12 is a timing diagram showing the assertion of the nuke signal 170 occurring synchronous with the rising edge of a clock signal 304.

At block 303, the active thread state machine is evaluated. At block 306 the sequence number and last microinstruction signal, that indicates whether the microinstruction on which the event occurs retired or not, for both the first and the second threads are communicated to the allocation and free list management logic 122 and the TBIT which is a structure in a Trace Branch Prediction Unit (TBPU) (that is in turn part of the TDE 60) for tracking macroinstruction and microinstruction pointer information within the in-order front-end of the processor 30. The TBIT utilizes this information to latch information concerning the event (e.g., the microinstruction and macroinstruction instruction pointer).

At block 308, the event detector 188 constructs and propagates an event vector for each of the first and second threads to the microcode sequencer 66. Each event vector includes, inter alia, information that identifies (1) the physical reorder buffer location that was retiring when the nuke point (or clearing point) was located (i.e., the value of each retirement pointer 182 when the nuke point was identified), (2) an event handler identifier that identifies a location within the microcode sequencer 66 where microcode constituting an event handler 67 to process the detected event is located, and (3) a thread identifier to identify either the first or the second thread, and (4) a thread priority bit that determines the priority of the event handler 67 relative to the event handler invoked for other threads.

At block 310, the allocation and free list management logic 122 utilizes the sequence numbers communicated at block 306 to advance a shadow register alias table (shadow RAT) to a point at which the nuke point was detected and, at block 312, the state of the primary register alias table 120 is restored from the shadow register alias table.

At block 314, the allocation and free list management logic 122 recovers register numbers (or "marbles") from the free list manager 134, and assigns the recovered register numbers to the trash heap array 132 from which the register numbers may again be allocated. The allocation and free list management logic 122 furthermore asserts a "recovered" signal (not shown) when all appropriate register numbers have been recovered from the free list manager 134. The nuke signal 170 is held in an asserted state until this "recovered" signal is received from the allocation and free list management logic 122.

At block 316, all "senior" stores (i.e., stores that have retired but have not yet updated memory) for both the first and second threads are drained from the memory order buffer using store commit logic (not shown).

At block 320, the event detector 188 then de-asserts the nuke signal 170 on a rising edge of the clock signal 304, as shown in FIG. 12. It will be noted that the nuke signal 170 was held in an asserted state for a minimum of three clock cycles of the clock signal 304. However, in the event that the "recovered" signal from the allocation and free list management logic 122 is not asserted within the first two clock cycles of the clock signal 304 following the assertion of the nuke signal 170, the event detector 188 will extend assertion of the nuke signal 170 beyond the illustrated three clock cycles. The nuke signal 170 may, in one embodiment, be held long enough (e.g., the three clock cycles) to allow completion of blocks 303, 306 and 308 discussed above. The nuke signal 170 may be required to be held for additional cycles to allow completion of blocks 310, 312, 314 and 316. To this end, the memory order buffer asserts a "store buffer drained" signal to extend the assertion of the nuke signal.

At block 322, the microcode sequencer 66 and other functional units within the multithreaded processor 30 examine "active bits" maintained by the active thread state machine 171 to determine whether the first and second threads are each within an active or an inactive state following the occurrence of the event. More specifically, the active thread state machine 171 maintains a respective bit indication for each thread extant within the multithreaded processor 30 that indicates whether the relevant thread is in an active or inactive (sleep) state. The event, detected by the event detector 188 and responsive to which the event detector 188 asserted the nuke signal 170, may comprise either a SLEEP event 264 or a BREAK event that transitions either the first or the second thread between active and inactive states. As indicated at 324 in FIG. 12, the active thread state machine 171 is evaluated during the assertion of the nuke signal 170, and the state of the "active bits" are accordingly regarded as valid upon the de-assertion of the nuke signal 170.

At decision box 326, each of the functional units that examined the active bits of the active thread state machine 171 makes a determination as to whether both the first and second threads are active. If both threads are determined to be active based on the state of the active bits, the method 300 proceeds to block 328, where each of the functional units is configured to support and service both the first and the second active threads. For example, storage and buffering capabilities provided within various functional units may be logically partitioned by activating a second pointer, or a second set of pointers, that are limited to a specific set (or range) of entries within a storage array. Further, some MT specific support may be activated if two threads are active. For example, thread selection logic associated with the microcode sequencer may sequence threads from a first thread (e.g., T0), from a second thread (e.g., T1) or from both first and second threads (e.g., T0 and T1) in a "ping-pong" manner based on the output of the active thread state machine 171. Further, localized clock gating may be performed based on the bit output of the active thread state machine. In a further embodiment, any number of state machines within a processor may modify their behavior, or change state, based on the output of the active thread state machine. At block 330, the microcode sequencer 66 then proceeds to sequence microinstructions for both the first and second threads.

Alternatively, if it is determined at decision box 326 that only one of the first and second threads is active, or that both threads are inactive, each of the functional units is configured to support and service only a single active thread at block 332 and some MT specific support may be deactivated. Where no threads are active, functional units are as a default setting configured to support a single active thread. In the case where a functional unit was previously configured (e.g., logically partitioned) to support multiple threads, pointers utilized to support further threads may be disabled, and the set of entries within a data array that are referenced by remaining pointer may be expanded to include entries previously referenced by the disabled pointers. In this way, it will be appreciated that data entries that previously allocated to other threads may then be made available for use by a single active thread. By having greater resources available to the single active thread when further threads are inactive, the performance of the single remaining thread may be enhanced relative to the performance thereof when other threads are also supported within the multithreaded processor 30.

At block 334, the microcode sequencer 66 ignores event vectors for an inactive thread, or inactive threads, and sequences microinstructions only for a possible active thread. Where no threads are active, the microcode sequencer 66 ignores the event vectors for all threads.

By providing active bits maintained by the active thread state machine 171 that can be examined by various functional units upon the de-assertion of the nuke signal 170 (signaling the end of a nuke operation), a convenient and centralized indication is provided according to which the various functional units may be configured to support a correct number of active threads within a multithreaded processor 30 following completion of a nuke operation.

Figure 11B:
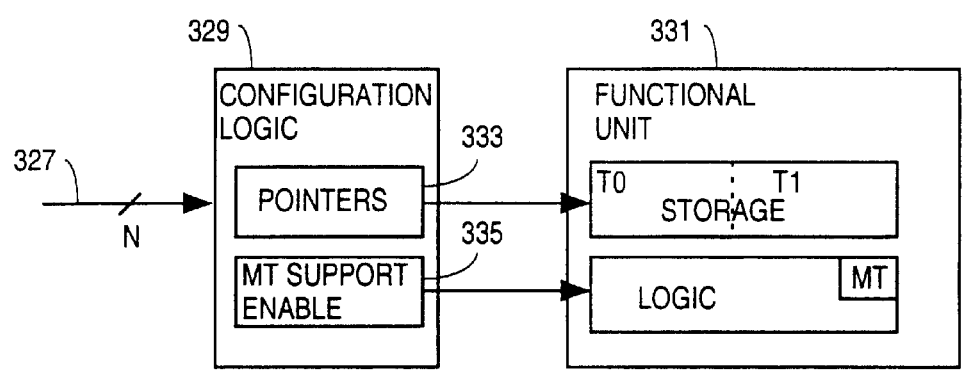
FIG. 11B is a block diagram illustrating configuration logic, according to one exemplary embodiment, that operates to configure a functional unit in accordance with the output of an active thread state machine.

FIG. 11B is a block diagram showing exemplary configuration logic 329, which is associated with a functional unit 331, and that operates to configure the functional unit 331 to support one or more active threads within the multithreaded processor. The functional unit 331 may be any one of the functional units described above, or any functional unit that will be understood by a person skilled in the art to be included within a processor. The functional unit 331 is shown to have both storage and logic components that are configured by the configuration logic 329. For example, the storage component may comprise a collection of registers. Each of these registers may be allocated to storing microinstruction or data for a specific one of these threads when multiple threads are active (i.e., when a processor is operating in a MT mode). Accordingly, the storage component as shown in FIG. 11B to be logically partitioned to support first and second threads (e.g., T0 and T1). Of course, the storage component could be partitioned to support any number of active threads.

The logic component is shown to include MT logic that is specifically to support multithreaded operation within the processor (i.e., a MT mode).

The configuration logic 329 is shown to maintain pointer values 333, which are outputted to the storage component of the functional unit 331. In one exemplary embodiment, these pointer values 333 are utilized to logically partition the storage component. For example, a separate pair of read and write pointer values could be generated for each active thread. The upper and lower bounds of the pointer values for each thread are determined by the configuration logic 329 dependent on the number of active threads. For example, the range of registers that may be indicated by a set of pointer values for a particular thread may be increased to cover registers previously allocated to another thread, should that other thread become inactive.

The configuration logic 329 also includes MT support enable indications 335, that are outputted to the logic component of the functional unit to either enable or disable the MT support logic of the functional logic 331.

The active bits 327, outputted by the active thread state machine 174, provide input to the configuration logic, and are utilized by the configuration logic 329 to generate the appropriate point of values 333 and to provide the appropriate MT support enable outputs.

Exclusive Access by an Event Handler

Certain event handlers (e.g., those for handling the paging and synchronization events) require exclusive access to the multithreaded processor 30 to utilize shared resources and to modify shared state. Accordingly, the microcode sequencer 66 implements an exclusive access state machine 69 which gives exclusive access, in turn, to event handlers for the first and second threads where either of these event handlers requires such exclusive access. The exclusive access state machine 69 may only be referenced when more than one thread is active within the multithreaded processor 30. A flow marker, associated with an event handler that is provided with exclusive access, is inserted into the flow for the thread to mark the end of the exclusive code comprising the event handler. Once the exclusive access is completed for all threads, the microcode sequencer 66 resumes normal issuance of microinstructions.

Figure 13:
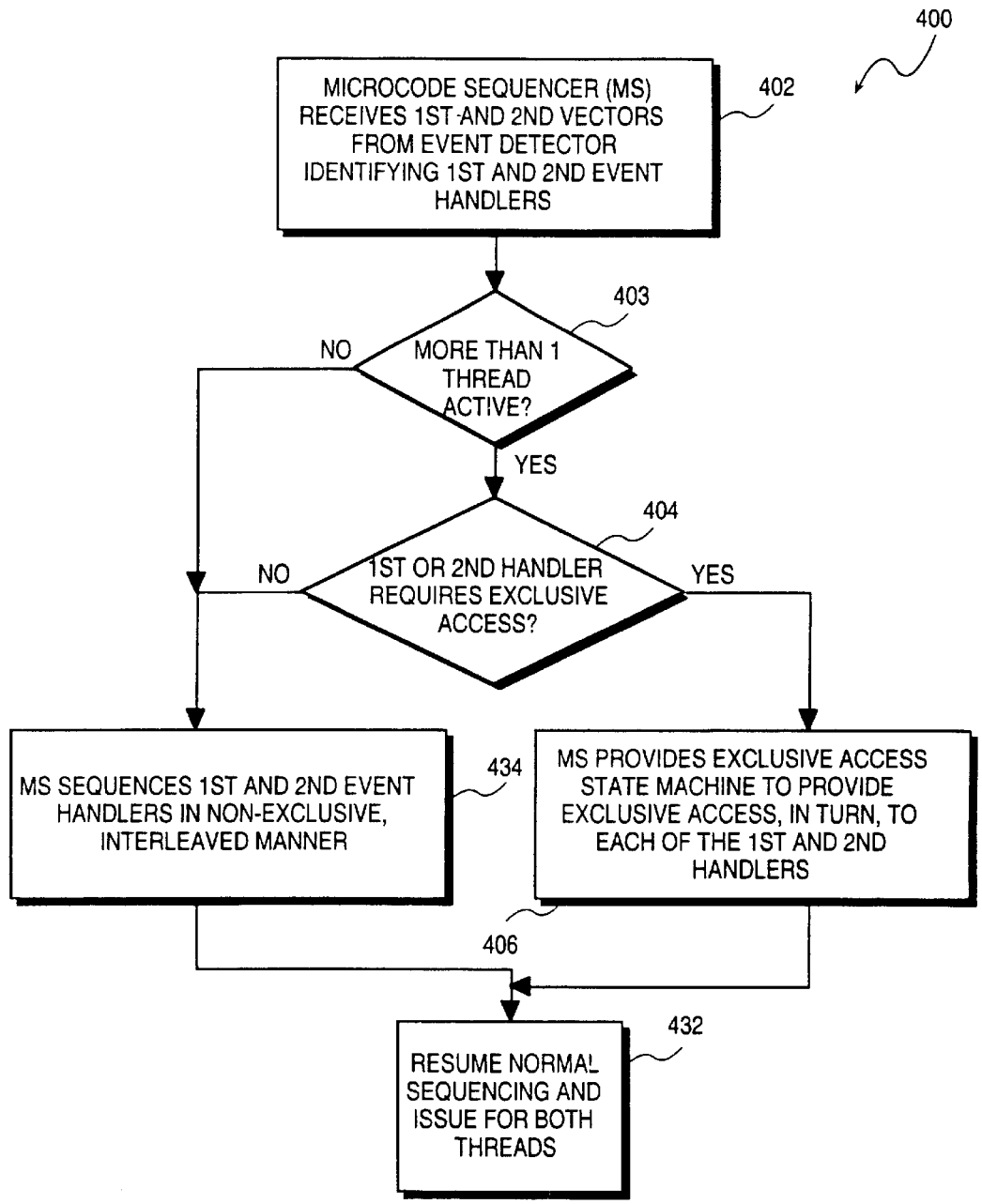
FIG. 13 is a flow chart illustrating a method, according to one embodiment, of providing exclusive access to an event handler within a multithreaded processor.

FIG. 13 is a flowchart illustrating a method 400, according to exemplary embodiment, of providing exclusive access to an event handler 67 within a multithreaded processor 30. The method 400 commences at block 402 with the receipt by the microcode sequencer 66 of first and second event vectors, for respective first and second threads, from the event detector 188. As described above, each of the first and second event vectors will identify a respective event handler 67.

At decision box 403, a determination is made as to whether more than one (1) thread is active. This determination is made by the microcode sequencer with reference to the active thread state machine 171. If not, the method 400 proceeds to block 434. If so, the method 400 proceeds to decision box 404.

Figure 14:
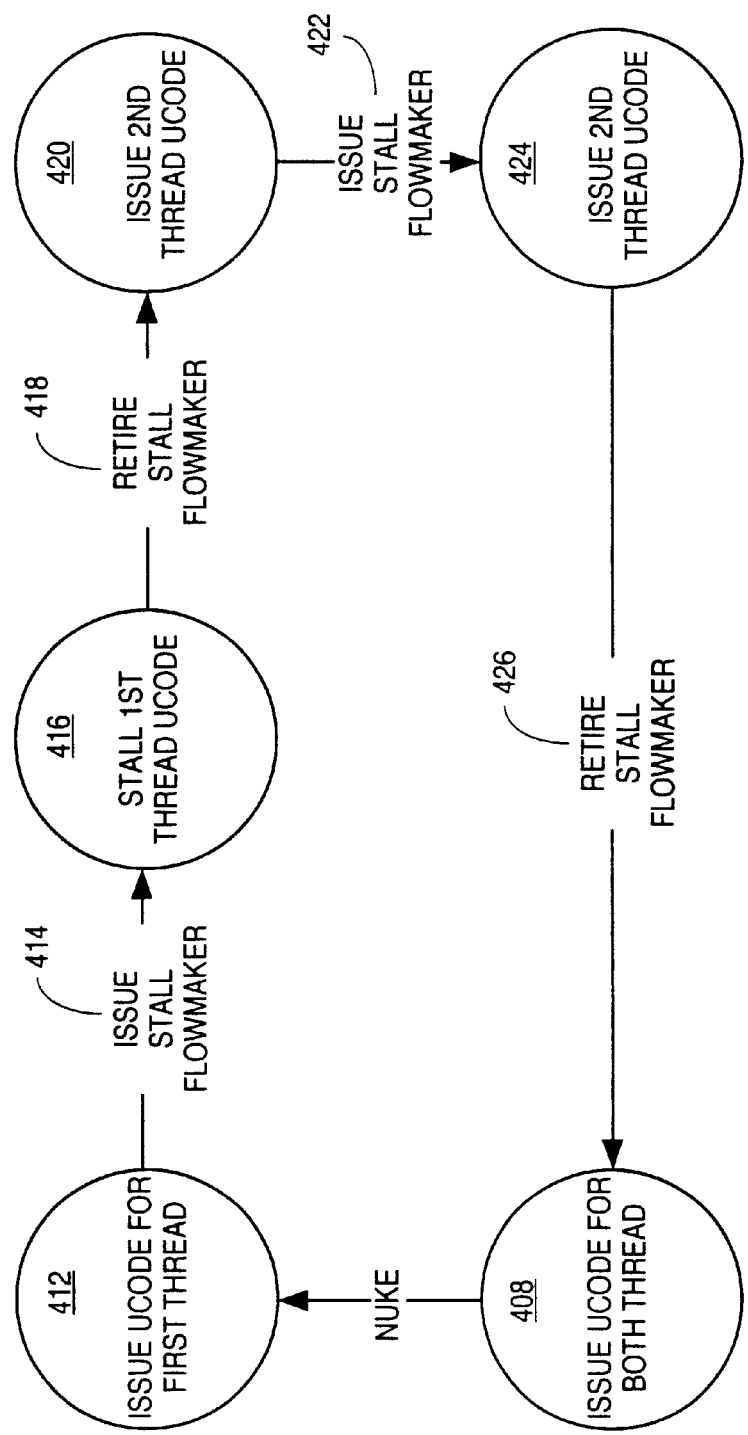
FIG. 14 is a state diagram depicting operation, according to one embodiment, of an exclusive access state machine implemented within a multithreaded processor.

At decision box 404, the microcode sequencer 66 makes a determination as to whether either of the first or second event handlers 67 requires exclusive access to a shared resource, or modifies a shared state. If so, at block 406 the microcode sequencer 66 implements the exclusive access state machine 69 to provide exclusive access, in turn, to each of the first and second event handlers 67. FIG. 14 is a state diagram depicting operation, according to exemplary embodiment, of the exclusive access state machine 69. The state machine 69 is shown to include five states. In a first state 408, microcode for the first and second threads is both issued by the microcode sequencer 66. On the occurrence of a nuke operation 410 responsive to an event that requires an exclusive access event handler, the state machine 69 transitions to a second state 412, wherein a first event handler 67 (i.e., microinstructions), associated with an event for a first thread, is issued. Following the sequencing of all microinstructions that constitute the first event handler 67, and also following completion of all operations instructed by such microinstructions, the microcode sequencer 66 then issues a stall microinstruction (e.g., microinstruction having an associated stall flow marker) at 414 to transition the state machine 69 from the second state 412 to a third state 416 in which issuance of a first thread microinstructions is stalled. At 418, the stall microinstruction issued at 414 is retired from the reorder buffer 162 to thereby transition the state machine 69 from the third state 416 to a fourth state 420 in which the microcode sequencer 66 issues the second event handler 67, associated with an event for the second thread. Following the sequencing of all microinstructions that constitute the second event handler 67, and also following the completion of all operations instructed by such microinstructions, the microcode sequencer 66 then issues a further stall microinstruction at 422 to transition the state machine 69 from the fourth state to a fifth state 424 in which the second event handler 67 is stalled. At 426, the stall microinstruction issued at 422 is retired from the reorder buffer 162 to thereby transition the state machine 69 from the fifth state 424 back to the first state 408.

At block 432, the normal sequencing and issuance of microinstructions for both the first and second threads is resumed, assuming that both threads are active.

Alternatively, if it is determined the decision box 404 that neither of the first or second event handlers require exclusive access to shared resources or state of the processor 30, the method proceeds to block 434, where the microcode sequencer 66 sequences microcode constituting the first and second event handlers 67 a non-exclusive, interleaved manner.

The Active Thread State Machine (171)

Figure 15:
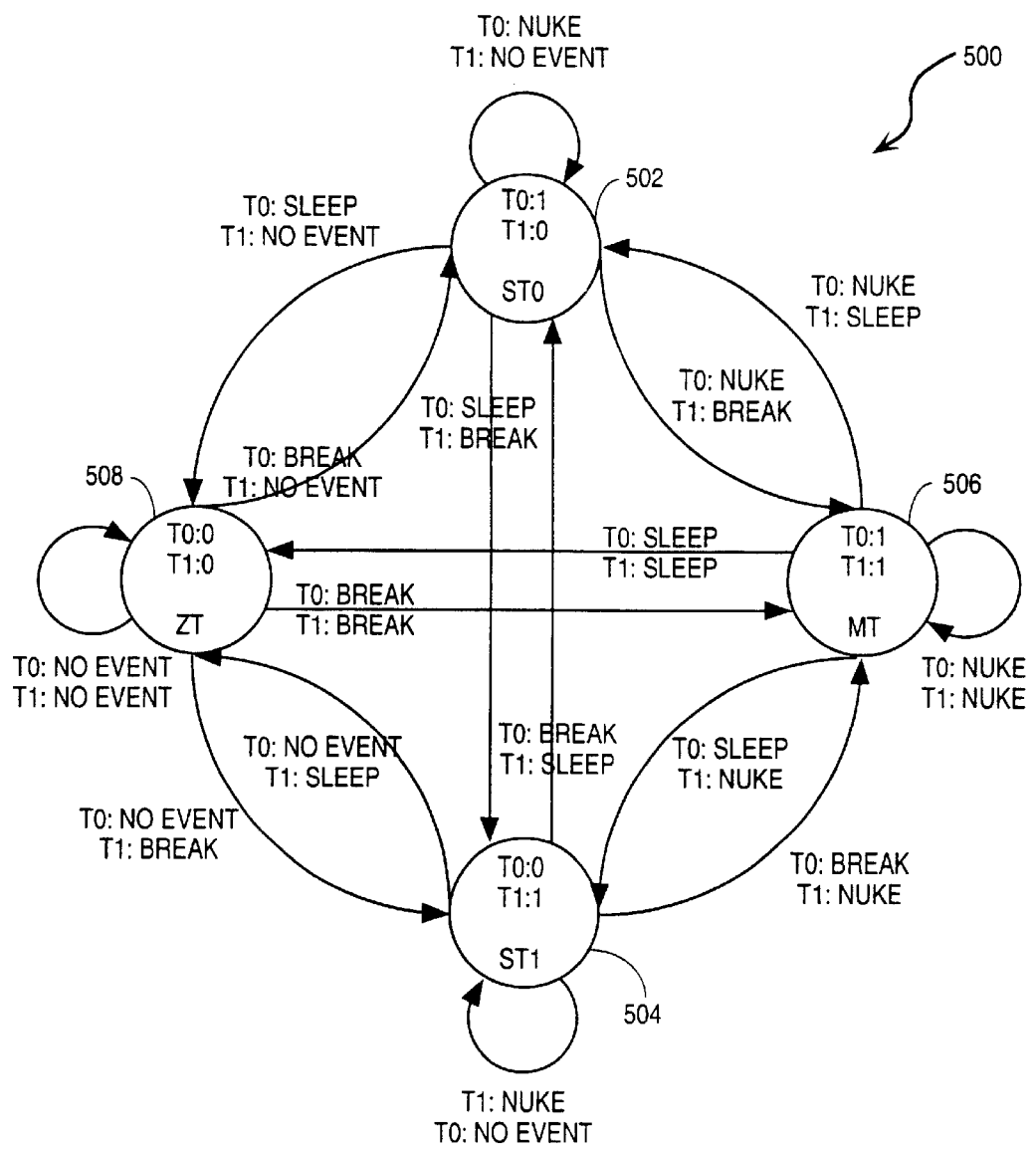
FIG. 15 is a state diagram illustrating states, according to one embodiment, that may be occupied by an active thread state machine implemented within a multithreaded processor.

FIG. 15 is a state diagram 500 illustrating states, according to an exemplary embodiment, that may be occupied by the active thread state machine 171 and also illustrating transition events, according to an exemplary embodiment, that may cause the active thread state machine 171 to transition between the various states.

The active thread state machine 171 is shown to reside in one of four states, namely a single thread 0 (ST0) state 502, a single thread 1 (ST1) state 504, a multi-thread (MT) state 506, and a zero thread (ZT) state 508. The active thread state machine 171 maintains a single active bit for each thread that, when set, identifies the associated thread as being active and, when reset, indicates the associate thread as being inactive or asleep.

The transitions between the four states 502-508 are triggered by event pairs, each event of an event pair pertaining to the first or the second thread. In the state diagram 500, a number of event types are indicated as contributing towards a transition between states. Specifically, a SLEEP event is an event that causes a thread to become inactive. A BREAK event is an event that, when occurring for a specific thread, causes the thread to transition from an inactive state to an active state. Whether a particular event qualifies as a BREAK event may depend on the SLEEP event that caused the thread to become inactive. Specifically, only certain events will cause a thread to become active once inactive as a result of a specific SLEEP event. A NUKE event is any event, when occurring for specific thread, that results in the performance of a nuke operation, as described above. All events discussed above with reference to FIG. 8 potentially comprise nuke events. Finally, a "no event" occurrence with respect to a specific thread is also illustrated within the state diagram 500 as being a condition that may be present in combination with an event occurrence with respect to a further thread to cause a state transition.

In one embodiment, if a SLEEP event is signaled for a particular thread, and a BREAK event for that thread is pending, the BREAK event is serviced immediately (e.g., the thread does not go to sleep and wake later to service the BREAK event). The reverse may also be true, in that a BREAK event may be signaled for a particular thread, and a SLEEP event is pending, whereafter the BREAK event s then serviced.

Upon the assertion of the nuke signal 170 by the event detector 188, the active thread state machine 171 is evaluated, as indicated at 324 in FIG. 12. Following de-assertion of the nuke signal 170, all functional units within the multithreaded processor 30 are configured based on the active bits maintained by the active thread state machine 171. Specifically, the checker, replay and retirement unit (CRU) 160 propagates a signal generated based on the active bits to all effected functional units to indicate to the functional units how many threads are extant within the multithreaded processor, and which of these threads are active. Following the assertion of the nuke signal 170, the configuration of the functional units (e.g. partitioning or un-partitioning) is typically completed in one clock cycle of the clock signal 304.

Thread Exit and Entry

The present invention proposes an exemplary mechanism whereby threads within a multithreaded processor 30 may enter and exit (e.g., become active or inactive) where such entry and exiting occurs in a uniform sequence regardless of the number of threads running, and where clock signals to various functional units may be gracefully stopped when no further threads within the multithreaded processor 30 are active or running.

As described above with reference to the state diagram 500, thread entry (or activation) occurs responsive to the detection of a BREAK event for a currently inactive thread. BREAK event definition for a specific inactive thread is dependent on the reason for the relevant thread being inactive. Thread exit occurs responsive to a SLEEP event for a currently active thread. Examples of SLEEP events include the execution of a halt (HLT) instruction included within an active thread, the detection of a SHUTDOWN or an ERROR_SHUTDOWN condition, or a "wait for SIPI" (start-up inter-processor interrupt) condition with respect to the active thread.

Soft Nuke

Another embodiment of the multithreaded processor 30 provides an additional type of nuke (state-clearing)

mechanism, referred to herein as a "soft nuke". In one embodiment, a soft nuke performs less than all of the actions performed by either the above-described single-threaded nuke process 274 (FIG. 7A) or the multi-threaded nuke process 280 (which are henceforth referred to as variations of a "hard nuke", to contrast them with the soft nuke) and requires much less time to execute. In that case, a soft nuke can be considered a lower-impact nuke than a hard nuke. In an alternative embodiment, however, a soft nuke can be implemented in the form of a branch misprediction. For example, when an instruction which causes a soft nuke retires, it can be treated as a mispredicted branch, as described above. In yet another embodiment, a soft nuke clears state for only a single thread, as in block 274 of FIG. 7A.

Thus, the term "soft" in soft nuke primarily indicates that the soft nuke has less negative performance impact on the processor 30 than a hard nuke does, but does not necessarily indicate the nature of its implementation (i.e., software vs. hardware). Nonetheless, in one embodiment a soft nuke is implemented in software (microcode) while a hard nuke is implemented in hardware; other implementations may be used, however.

A soft nuke can be specified by the designer of a processor to be used for specific events or specific classes of events, as described below. A soft nuke provides several advantages over a hard nuke. One important advantage is that soft nuke is faster, as noted above. One reason for the greater recovery speed for a soft nuke is that, in contrast with a multi-threaded hard nuke, a soft nuke does not require cross-thread synchronization, which would consume a significant number of clock cycles, thereby degrading the overall performance of the processor. Also, in contrast with a multi-threaded hard nuke, a soft nuke clears state only for the thread from which it was initiated (i.e., the thread in which the initiating event was detected). The greater recovery speed of a soft nuke compared to a hard nuke can have a significant positive impact on the overall performance of the processor.

Accordingly, during design of the processor, events can be categorized according to whether soft nuke may be performed in response to such events and encoded accordingly in the processor. In one embodiment, this categorization can be changed dynamically during operation. During operation, when an event is detected for a particular thread, a soft nuke is used to clear state if soft nuke is permitted for that event; otherwise, a hard nuke is used according to the process defined above.

In addition, if a soft nuke is implemented as a branch misprediction as noted above, restart can be implemented in hardware, rather than microcode, to add to the performance benefit. Moreover, for certain events, a soft nuke can restart micro-operations into the pipeline without waiting for store buffer eviction.

In one embodiment, a soft nuke performs all of the same general state clearing operations as a hard nuke; however, in such embodiment: 1) a soft nuke is implemented in microcode, whereas a hard nuke is hardwired; 2) a soft nuke does not require cross-thread synchronization and clears state for only the thread from which the soft nuke was initiated; and 3) for some events, soft nuke does not drain the store buffer (i.e., for events for which handling of the event does not require the architectural state in the store buffer to be observed outside the CPU before handling the soft nuke).

Figure 16:
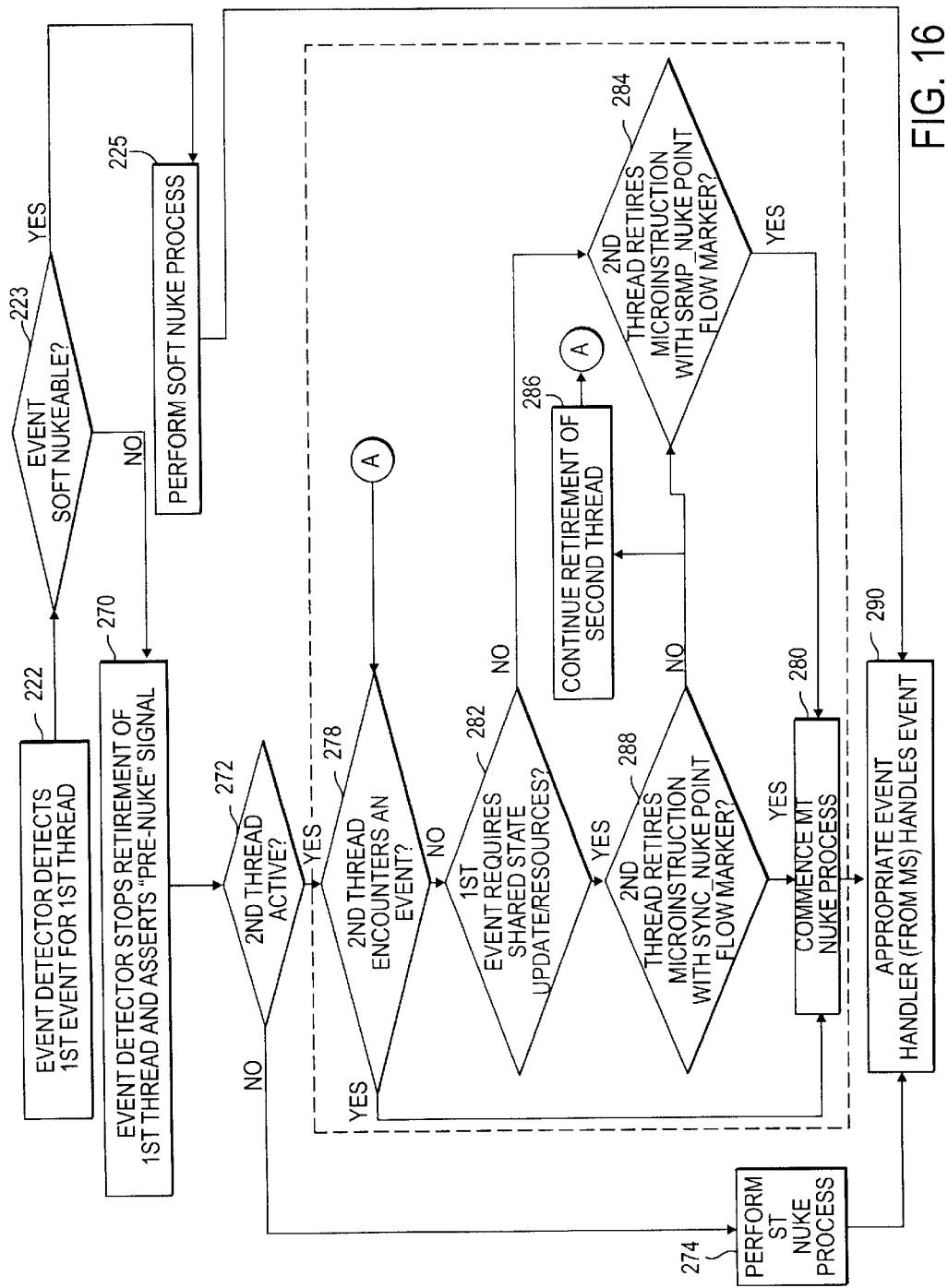
FIG. 16 is a flow chart illustrating a variation of the method of FIG. 7A, for processing an event within a multithreaded processor.

FIG. 16 shows a method for processing an event in the multithreaded processor 30, for an embodiment which includes soft nuke capability. Note that the method illustrated in FIG. 16 is identical to the method of FIG. 7A, except that block 223 is executed immediately after block 222 instead of block 270. In block 223, a determination is made of whether a soft nuke can be performed for this particular event (i.e., whether the event is "soft nukeable"). The determination can be made from previously stored data (e.g., a lookup table) indicating whether soft nuke can be performed for each event (or groups of events) that may occur in the processor 30. Optionally, the absence of such a stored indication for an event may result, by default, in a negative outcome to decision block 223. Alternatively, the determination of whether the event is soft nukeable can be made by hardwired decoder logic. If soft nuke cannot be performed for the event, the method proceeds to block 272, described above. If soft nuke can be performed for this event, the method proceeds to block 225, in which the soft nuke is executed, after which the method proceeds to block 290, described above.

If a soft nuke cannot be performed in response to the first event, then as described above, the method asserts the prenuke signal at block 270 and, if a second thread is active, waits for a nukeable point in the second thread in box 276. In that case, when an event is subsequently detected in the second thread, a soft nuke is not performed in response to the second event, regardless of whether the second event is of a type for which soft nuke generally may be performed. The reason for this is that, in this situation, cross-thread synchronization is required to make progress in the thread corresponding to the first event; so soft nuke is not done, because it would delay the first thread.

An important aspect of the soft nuke approach lies in identifying the types of events for which a soft nuke may be used, i.e., generating the stored indications on which the decision of block 223 (FIG. 16) will be based. This determination is normally made by the chip designer during the design process. In general, soft nuke may be specified for any event that does not require cross-thread synchronization for purposes of clearing state. However, the best candidate events for soft nuke are those events that are used frequently, must be processed very quickly, and do not require draining of the store buffer (the store buffer is a buffer for STORE micro-operations, located in the memory subsystem of processor 30). In one embodiment, in which soft nuke is implemented in microcode, soft nuke never performs cross-thread synchronization and only performs store buffer eviction for those events which require it. This is in contrast with a hard nuke, which always performs cross-thread synchronization when multiple threads are active and which drains the store buffer for all events.

Refer again to FIG. 8, which depicts a number of exemplary events 224 that may be detected by the event detector 188 at block 222. Use of soft nuke is particularly advantageous in response to a type of ASSIST event 232 known as a MONuke. In general, a MONuke is an event that indicates a memory ordering (MO) conflict. In one embodiment, there are three possible situations which might cause an MONuke event, each of which is amenable to using soft nuke. The first situation is a multithreaded snoop, which occurs when a STORE micro-operation in the second thread hits (has the same address as) a LOAD micro-operation in the first thread. The second situation is an external processor snoop, which occurs when a STORE micro-operation from a different physical processor hits a LOAD micro-operation in a given thread. The third situation is a memory alias nuke, which occurs when a STORE micro-operation is detected that could alias the same physical address accessed by a linear address of a LOAD micro-operation. In each of these cases, soft nuke can be used advantageously to reduce hardware by implementing the nuke in microcode.

It will be recognized that many other types of events may be good candidates for soft nuke, depending on the particular processor implementation. Examples of such other events might include, for example, data page faults and numeric exceptions.

Thus, a method and apparatus for processing an event within a multithreaded processor have been described. Although the present has been described with reference to specific exemplary embodiments, it will be evident that various modifications and changes may be made to these embodiments without departing from the broader scope and spirit of the invention. Accordingly, the specification and drawings are to be regarded in an illustrative rather than a restrictive sense.

What is claimed is:

1. A processor comprising:
    retirement logic from which microinstructions for both a first thread and a second thread being processed within the processor are retired; and
    an event detector, coupled to the retirement logic, to detect an event for the first thread; responsive to the detection of the event, to determine whether to execute a first state clearing process or a second state clearing process; and to execute either the first state clearing process or the second state clearing process, depending on the event.

2. A processor as recited in claim 1, wherein the second state clearing process requires synchronization between the first and second threads, and wherein the first state clearing process does not require synchronization between the first and second threads.

3. A processor as recited in claim 1, wherein the first state clearing process clears state for only one of the first thread and the second thread, and the second state clearing process clears state for both the first thread and the second thread.

4. A processor as recited in claim 1, wherein the first state clearing process includes a first plurality of actions and the second state clearing process includes a second plurality of actions, the first plurality of actions being a partial subset of the second plurality of actions.

5. A processor as recited in claim 4, wherein the first state clearing process requires substantially less time to execute than the second state clearing process.

6. A processor as recited in claim 1, wherein the first state clearing process comprises clearing state for the first thread and not clearing state for the second thread.

7. A processor as recited in claim 6, wherein the second state clearing process comprises:
    monitoring the second thread to detect a clearing point for the second thread; and
    in response to detection of the clearing point for the second thread, clearing state for both the first thread and the second thread.

8. A processor as recited in claim 1, wherein the first state clearing process is executed if the event is one of a predetermined set of memory ordering conflict events.

9. A processor as recited in claim 8, wherein the predetermined set of memory ordering conflict events comprises a multithreaded snoop.

10. A processor as recited in claim 8, wherein the predetermined set of memory ordering conflict events comprises an external processor snoop.

11. A processor as recited in claim 8, wherein the predetermined set of memory ordering conflict events comprises a memory alias event.

12. A processor as recited in claim 1, wherein the second state clearing process is identical for each event in response to which it is used, and wherein the first state clearing process varies according to the event in response to which it is used.

13. A processor as recited in claim 12, wherein the multithreaded processor comprises a store buffer to buffer store operations, wherein the second state clearing process comprises clearing the store buffer, and wherein the first state clearing process comprises clearing the store buffer only in response to certain events and not in response to other events.

14. A processor as recited in claim 1, wherein the first state clearing process is software-implemented and the second state clearing process is hardware implemented.

15. A processor as recited in claim 1, wherein the first state clearing process and the second state clearing process each comprise clearing the state of an instruction pipeline of the multithreaded processor.

16. A microprocessor comprising:
    means for detecting an event for a first thread being processed in the microprocessor, the microprocessor also having a second thread being processed concurrently with the first thread;
    means for determining, in response to detecting the event, whether a first state clearing process is to be used responsive to the event; and
    means for executing the first state clearing process if the first state clearing process is to be used responsive to the event, the first state clearing process clearing state for only the first thread, and for executing the second state clearing process if the second state clearing process is to be used responsive to the event, the second state clearing process clearing state for both the first thread and the second thread.

17. A microprocessor as recited in claim 16, wherein the second state clearing process requires synchronization between the first and second threads, and wherein the first state clearing process does not require synchronization between the first and second threads.

18. A microprocessor as recited in claim 16, wherein the first state clearing process comprises clearing state for the first thread independently of the second thread.

19. A microprocessor as recited in claim 18, wherein the second state clearing process comprises:
    monitoring the second thread to detect a clearing point for the second thread; and
    in response to detection of the clearing point for the second thread, clearing state for both the first thread and the second thread.

20. A microprocessor as recited in claim 16, further comprising categorizing a plurality of events which may occur in the multithreaded processor according to which of the first state clearing process and the second state clearing process is to be performed in response to each event.

21. A microprocessor as recited in claim 16, wherein the first state clearing process includes a first plurality of actions and the second state clearing process includes a second plurality of actions, the first plurality of actions being a partial subset of the second plurality of actions.

22. A microprocessor as recited in claim 16, wherein the first state clearing process requires substantially less time to execute than the second state clearing process.

23. A microprocessor as recited in claim 16, wherein the first state clearing process is software-implemented and the second state clearing process is hardware-implemented.

24. A microprocessor as recited in claim 16, wherein the first state clearing process is executed if the event is one of a predetermined set of memory ordering conflict events.

25. A microprocessor as recited in claim 24, wherein the predetermined set of memory ordering conflict events comprises a multithreaded snoop.

26. A microprocessor as recited in claim 24, wherein the predetermined set of memory ordering conflict events comprises an external processor snoop.

27. A microprocessor as recited in claim 24, wherein the predetermined set of memory ordering conflict events comprises a memory alias event.

28. A microprocessor as recited in claim 16, wherein the second state clearing process is identical for each event in response to which it is used, and wherein the first state clearing process varies according to the event in response to which it is used.

29. A microprocessor as recited in claim 28, wherein the multithreaded processor comprises a store buffer to buffer store operations, wherein the second state clearing process comprises clearing the store buffer, and wherein the first state clearing process comprises clearing the store buffer only in response to certain events and not in response to other events.

30. A microprocessor as recited in claim 16, wherein the first state clearing process and the second state clearing process each comprise clearing the state of an instruction pipeline of the multithreaded processor.

31. A machine-readable storage medium storing instructions which, when executed by a multithreaded processor, cause the processor to perform a method comprising:
    detecting an event for a first thread being processed in the multithreaded processor, the multithreaded processor also having a second thread being processed concurrently with the first thread;
    in response to detecting the event, determining whether a first state clearing process is to be used responsive to the event;
    if the first state clearing process is to be used responsive to the event, then executing the first state clearing process, the first state clearing process clearing state for only the first thread; and
    if the first state clearing process is not to be used responsive to the event occurrence, then executing a second state clearing process responsive to the event, the second state clearing process clearing state for both the first thread and the second thread.

32. A machine-readable storage medium as recited in claim 31, wherein the second state clearing process requires synchronization between the first and second threads, and wherein the first state clearing process does not require synchronization between the first and second threads.

33. A machine-readable storage medium as recited in claim 32, wherein the first state clearing process comprises clearing state for the first thread independently of the second thread.

34. A machine-readable storage medium as recited in claim 31, wherein the second state clearing process comprises:
    monitoring the second thread to detect a clearing point for the second thread; and
    in response to detection of the clearing point for the second thread, clearing state for both the first thread and the second thread.

35. A machine-readable storage medium as recited in claim 31, further comprising categorizing a plurality of events which may occur in the multithreaded processor according to which of the first state clearing process and the second state clearing process is to be performed in response to each event.

36. A machine-readable storage medium as recited in claim 31, wherein the first state clearing process includes a first plurality of actions and the second state clearing process includes a second plurality of actions, the first plurality of actions being a partial subset of the second plurality of actions.

37. A machine-readable storage medium as recited in claim 31, wherein the first state clearing process requires substantially less time to execute than the second state clearing process.

38. A machine-readable storage medium as recited in claim 31, wherein the first state clearing process is software-implemented and the second state clearing process is hardware-implemented.

39. A machine-readable storage medium as recited in claim 31, wherein the first state clearing process is executed if the event is one of a predetermined set of memory ordering conflict events.

40. A machine-readable storage medium as recited in claim 39, wherein the predetermined set of memory ordering conflict events comprises a multithreaded snoop.

41. A machine-readable storage medium as recited in claim 39, wherein the predetermined set of memory ordering conflict events comprises an external processor snoop.

42. A machine-readable storage medium as recited in claim 39, wherein the predetermined set of memory ordering conflict events comprises a memory alias event.

43. A machine-readable storage medium as recited in claim 31, wherein the second state clearing process is identical for each event in response to which it is used, and wherein the first state clearing process varies according to the event in response to which it is used.

44. A machine-readable storage medium as recited in claim 43, wherein the multithreaded processor comprises a store buffer to buffer store operations, where in the second state clearing process comprises clearing the store buffer, and wherein the first state clearing process comprises clearing the store buffer only in response to certain events and not in response to other events.

45. A machine-readable storage medium as recited in claim 31, wherein the first state clearing process and the second state clearing process each comprise clearing the state of an instruction pipeline of the multithreaded processor.

46. A method comprising:
    categorizing a plurality of events that can occur in a multithreaded processor according to which of a plurality of state clearing processes is to be performed in response to each event, the plurality of state clearing processes including a first state clearing process and a second state clearing process, the first state clearing process to clear state for only one of a plurality of threads being processing concurrently in the processor, the second state clearing process to clear state for at least two of said plurality of threads;
    in response to detecting an event in the processor, determining whether to execute the first state clearing process or the second state clearing process, according to a type of the event; and
    executing either the first state clearing process or the second state clearing process, according to the outcome of said determining.

47. A method as recited in claim 46, wherein the first state clearing process includes a first plurality of actions and the second state clearing process includes a second plurality of actions, the first plurality of actions being a partial subset of the second plurality of actions.

48. A method as recited in claim 47, wherein the first state clearing process requires substantially less time to execute than the second state clearing process.

49. A method as recited in claim 46, wherein the first state clearing process comprises clearing state for the first thread independently of the second thread.

50. A method as recited in claim 49, wherein the second state clearing process comprises:
monitoring the second thread to detect a clearing point for the second thread; and
in response to detection of the clearing point for the second thread, clearing state for both the first thread and the second thread.

51. A method as recited in claim 46, wherein the first state clearing process is executed if the event is one of a predetermined set of memory ordering conflict events.

52. A method as recited in claim 51, wherein the predetermined set of memory ordering conflict events comprises a multithreaded snoop.

53. A method as recited in claim 51, wherein the predetermined set of memory ordering conflict events comprises an external processor snoop.

54. A method as recited in claim 51, wherein the predetermined set of memory ordering conflict events comprises a memory alias event.

55. A method as recited in claim 46, wherein the second state clearing process is identical for each event in response to which it is used, and wherein the first state clearing process varies according to the event in response to which it is used.

56. A method as recited in claim 46, wherein the multithreaded processor comprises a store buffer to buffer store operations, wherein the second state clearing process comprises clearing the store buffer, and wherein the first state clearing process comprises clearing the store buffer only in response to certain events and not in response to other events.

57. A method as recited in claim 46, wherein the first state clearing process is software-implemented and the second state clearing process is hardware implemented.

58. A method as recited in claim 46, wherein the first state clearing process and the second state clearing process each comprise clearing the state of an instruction pipeline of the multithreaded processor.

59. A method comprising:
categorizing a plurality of events which may occur in a multithreaded processor according to which of a plurality of state clearing processes can be performed in response to each event, each of the plurality of state clearing processes capable of execution in the multithreaded processor, the plurality of state clearing processes including a software-implemented state clearing process and a hardware-implemented state clearing process, the software-implemented state clearing process including a first plurality of actions and the hardware implemented state clearing process including a second plurality of actions, the first plurality of actions being a partial subset of the second plurality of actions, wherein the software-implemented state clearing process requires substantially less time to execute than the hardware-implemented state clearing process;
detecting an event for a first thread being processed in the multithreaded processor, the multithreaded processor also having a second thread being processed concurrently with the first thread;
in response to detecting the event, determining whether the software implemented state clearing process can be used responsive to the event;
if the software-implemented state clearing process can be used responsive to the event, then executing the software-implemented state clearing process, including clearing state in the multithreaded processor for the first thread but not the second thread, wherein said clearing state for the first thread is done independently of the second thread;
if the software-implemented state clearing process cannot be used responsive to the event occurrence, then executing the hardware-implemented state clearing process responsive to the event, the hardware-implemented state clearing process including
monitoring the second thread to detect a clearing point for the second thread, and
in response to detection of the clearing point for the second thread, clearing state within the multithreaded processor for both the first thread and the second thread;
and
invoking an event handler to service the event after executing the software-implemented state clearing process or the hardware-implemented state clearing process.

60. A method as recited in claim 59, wherein the hardware-implemented state clearing process requires synchronization between the first and second threads, and wherein the software-implemented state clearing process does not require synchronization between the first and second threads.

61. A method as recited in claim 46, wherein the software-implemented state clearing process is executed if the event is one of a predetermined set of memory ordering conflict events.

* * * * *